United States Patent
Glenny et al.

(10) Patent No.: US 9,458,248 B2
(45) Date of Patent: Oct. 4, 2016

(54) CELLULOSE MIXED ESTERS

(71) Applicant: Resene Paints Limited, Lower Hutt (NZ)

(72) Inventors: Mark Glenny, Wellington (NZ); Colin Gooch, Upper Hutt (NZ); Simon Hinkley, Lower Hutt (NZ); Jennifer Mason, Lower Hutt (NZ); Cameron Tristram, Lower Hutt (NZ); Dennis Williams, Wellington (NZ)

(73) Assignee: Resene Paints Limited, Lower Hutt (NZ)

( * ) Notice: Subject to any disclaimer, the term of this patent is extended or adjusted under 35 U.S.C. 154(b) by 14 days.

(21) Appl. No.: 14/362,739

(22) PCT Filed: Dec. 5, 2012

(86) PCT No.: PCT/NZ2012/000228
§ 371 (c)(1),
(2) Date: Jun. 4, 2014

(87) PCT Pub. No.: WO2013/085397
PCT Pub. Date: Jun. 13, 2013

(65) Prior Publication Data
US 2014/0331895 A1     Nov. 13, 2014

Related U.S. Application Data

(60) Provisional application No. 61/567,068, filed on Dec. 5, 2011.

(51) Int. Cl.
| | | |
|---|---|---|
| C08B 3/16 | (2006.01) | |
| C09D 101/14 | (2006.01) | |
| C08H 8/00 | (2010.01) | |
| C08L 1/14 | (2006.01) | |
| D21H 17/27 | (2006.01) | |
| D21H 19/34 | (2006.01) | |
| D21H 19/52 | (2006.01) | |
| D21H 11/14 | (2006.01) | |

(52) U.S. Cl.
CPC . C08B 3/16 (2013.01); C08H 8/00 (2013.01); C08L 1/14 (2013.01); C09D 101/14 (2013.01); D21H 17/27 (2013.01); D21H 19/34 (2013.01); D21H 19/52 (2013.01); *D21H 11/14* (2013.01)

(58) Field of Classification Search
CPC .......... C08H 8/00; C08L 11/14; C08B 3/16; C09D 101/14; D21H 11/14; D21H 17/27; D21H 19/34; D21H 19/52
USPC ...................................... 536/64, 65
See application file for complete search history.

(56) References Cited

U.S. PATENT DOCUMENTS 1,900,871 A  *  3/1933  Staud ...................... C08B 3/14
                                                536/64

FOREIGN PATENT DOCUMENTS

| JP | 2003-082001 | 3/2003 | |
| JP | 2003-082001 A * | 3/2003 | ............... C08B 3/10 |
| WO | WO 2007/145955 | 12/2007 | |

* cited by examiner

*Primary Examiner* — Ganapathy Krishnan
(74) *Attorney, Agent, or Firm* — Cesari and McKenna, LLP

(57) ABSTRACT

The present invention relates to cellulose mixed esters, processes for preparing these and uses of the cellulose mixed esters, for example in coating compositions. The cellulose mixed esters have glass transition temperatures that fall within an appropriate range to allow for film formation to occur at ambient temperatures and have a total degree of substitution per anhydroglucose unit of about 2.5 to about 3.5; a residual hydroxyl functionality per anhydroglucose unit of 0 to about 0.5; a degree of substitution per anhydroglucose unit by $C_2$-$C_6$ ester groups of about 0.5 to about 2.8; and a degree of substitution per anhydroglucose unit by levulinyl ester groups of about 0.2 to about 2.6.

25 Claims, 5 Drawing Sheets

CELLULOSE MIXED ESTERS

CROSS REFERENCE TO RELATED APPLICATIONS

This application is the National Stage of International Application No. PCT/NZ2012/000228, filed on Dec. 5, 2012, which claims the benefit of U.S. Provisional Application No. 61/567,068, filed on Dec. 5, 2011. The contents of both applications are hereby incorporated by reference in their entirety.

TECHNICAL FIELD

This invention relates to cellulose mixed esters, processes for preparing these and uses of the cellulose mixed esters, for example in coating compositions.

BACKGROUND

Cellulose esters are well-known polymers that have found use in applications such as plastics, film and coatings. These types of esters have been used, for example, as film forming agents in solventborne coatings. Cellulose acetate butyrates (CABs), in particular, have been extensively investigated for use in coatings. Other known cellulose esters incorporate different functional groups, such as carboxylate functionalities, to alter the properties of the esters or to provide sites for further reaction and manipulation of the functional groups.

WO 2006/116367 describes cellulose mixed esters which have a high maximum degree of substitution and comprise acetyl groups as well as $C_3$-$C_4$ esters. They are said to be useful in coatings applications, for example as the major components in high solids or low VOC compositions. WO 2007/145955 describes that such cellulose mixed esters, having both acetyl and $C_3$-$C_4$ ester functionalities, can be used to improve properties such as the gloss of a coating composition.

U.S. Pat. No. 5,420,267 describes cellulose acetoacetate esters. These are mixed esters, comprising acyl groups and acetoacetyl groups. Edgar at al. report that a higher degree of acetoacetate substitution can lead to crosslinked films which exhibit improved solvent and water resistance and hardness [K J Edgar, C M Buchanan, J S Debenham, P A Rundquist, B D Seiler, M C Shelton, D Tindall, *Prog. Polym. Sci.* 26 (2001) 1605-1688].

A desirable feature for mixed cellulose esters which are to be used in coatings applications is that they can be formulated into a waterborne dispersion. However, examples of mixed cellulose esters having this property are uncommon as applied to coatings. U.S. Pat. No. 3,220,865 describes a mixed cellulosic ester (CAB) formulation where the CAB (10-27% w/w) is emulsified into a 20-40% w/w formulation in the application of a coating suitable for wood surfaces.

One of the challenges for coatings applications is to produce cellulose esters which have a glass transition temperature ($T_g$) that falls within an appropriate range. In coatings applications, a number of factors, such as polymer size, degree of crosslinking and the presence of additives such as plasticisers can affect the $T_g$ of the coating. The $T_g$ itself influences properties such as adhesion and drying speed of the coating.

A cellulose mixed ester which is to be used as the principal binder in coatings, without added plasticisers or coalescing solvents, would preferably have a $T_g$ which allows for film formation to occur at ambient temperatures. However, cellulose esters having glass transition temperatures in this range have proved elusive. For example, the cellulose mixed esters described in WO 2006/116367 and U.S. Pat. No. 5,420,267 have glass transition temperatures that fall within the range 75.27° C. to 120.37° C. and 136° C. to 225° C., respectively.

Current methods for lowering the $T_g$, such as the addition of plasticisers or coalescing solvents, are not always desirable. This presents a problem, as, to date, no cellulose mixed ester is known which has a $T_g$ that allows for film formation to occur at ambient temperatures without the addition of plasticisers or coalescing solvents.

However, the applicant has now found that chemical modification of cellulose esters can allow for control and manipulation of the $T_g$. Such chemical modification can be achieved if, for example, one has access to a suitable cellulose starting material which incorporates functional groups that can be readily derivatised. A levulinyl group is one such functional group.

WO 2007/094922 describes ester derivatives of levulinic acid which are said to be useful as plasticisers and/or coalescing solvents in polymer compositions. WO 2007/094922 also describes a method for lowering the glass transition temperature of a polymer composition by adding to it a levulinic acid ester derivative. Among the esters contemplated are those comprising a levulinyl group covalently bound to, inter alia, polysaccharides such as cellulose. This document describes the hydrolysis of corn fibre and the synthesis of levulinic acid ester derivatives of the polysaccharide and polyol residues of the hydrolysis. However, the document does not describe suitable cellulose mixed ester starting materials that could be employed in the synthesis of chemically modified cellulose esters.

The production of a mixed ester containing levulinic acid was also reported as a synthetic product of cellulose [Vladimirova, Gal'Braikh, Peker and Rogovin *Polym. Sci. U.S.S.R.* 7 (1964) 868-873]. While explicit experimental data was not reported, the methodology required the use of highly refined pre-treated cellulose starting materiel (viscose silk). In the inventor's hands, the reported reaction conditions with perchloric acid failed to produce a highly substituted mixed-ester cellulose derivative. Furthermore, the mixed ester produced by Vladimirova, when significantly more perchloric acid was used, was found to be unsuitable, have very poor solubility (especially on storage) and a high $T_g$ (120° C.). Further, the methodology of Vladimirova has been found not to work with less refined cellulose or pre-substituted cellulose starting material and it is not possible to tune the molecular size. The work of Vladimirova et al. shows the difficulty in producing mixed esters suitable for use in coatings.

Another challenge of coatings applications utilising cellulose esters is to provide solubility characteristics and properties that prevent ready dispersion or emulsification of the polymer. A cellulose ester that has a further reaction site that is suitable for tuning solubility and emulsifying properties is highly desirable. For example, the opportunity to tune the acid-number of the polymer such that stable emulsification, stable dispersion or even water solubility may be conferred onto the polymer back-bone.

There is therefore a need for cellulose esters, e.g. cellulose mixed esters that can be used as starting materials for preparing a variety of cellulose mixed ester derivatives, such as those which have glass transition temperatures that fall within an appropriate range to allow for film formation to occur at ambient temperatures. There is also a need for processes for making such cellulose esters. It is therefore an object of the invention to provide novel cellulose mixed esters, or to at least provide a useful alternative.

SUMMARY OF THE INVENTION

In a first aspect, the invention provides a cellulose mixed ester having:
- a total degree of substitution per anhydroglucose unit of about 2.5 to about 3.5;
- residual hydroxyl functionality per anhydroglucose unit of 0 to about 0.5;
- a degree of substitution per anhydroglucose unit by $C_2$-$C_6$ ester groups of about 0.5 to about 2.8; and
- a degree of substitution per anhydroglucose unit by levulinyl ester groups of about 0.2 to about 2.6.

Preferably the cellulose mixed ester of the first aspect of the invention has a weight average molecular weight (Daltons) of about 800 to about 105,000. More preferably the cellulose mixed ester has a weight average molecular weight of about 5000 to about 50000, e.g. about 5000 to about 40000, e.g. about 5000 to about 30000, e.g. about 5000 to about 20000.

Preferably the cellulose mixed ester of the first aspect of the invention has a degree of polymerisation of from about 2 to about 250, e.g. from about 5 to about 200, e.g. from about 5 to about 100 e.g. from about 5 to about 30. In some embodiments, the degree of polymerisation is about 15 to about 50, e.g. about 20 to about 40, e.g. about 30.

In some embodiments of the first aspect of the invention, the cellulose mixed ester has a total degree of substitution per anhydroglucose unit of about 2.5 to about 3.3, e.g. 2.9 to about 3.2, e.g. about 3.0 to about 3.1.

In some embodiments of the first aspect of the invention, the cellulose mixed ester has a degree of substitution per anhydroglucose unit by levulinyl ester groups of about 0.5 to about 2.5, e.g. about 0.75 to about 1.9, e.g. about 0.8 to about 1.85.

In some embodiments of the first aspect of the invention, the cellulose mixed ester has a degree of substitution per anhydroglucose unit by $C_2$-$C_6$ ester groups of about 0.5 to about 2.5, e.g. about 1.1 to about 2.25.

Preferably the cellulose mixed ester of the first aspect of the invention has a degree of substitution per anhydroglucose unit by levulinyl ester groups of about 0.75 to about 1.9 and a degree of substitution per anhydroglucose unit by $C_2$-$C_6$ ester groups of about 1.1 to about 2.25.

In some embodiments of the first aspect of the invention, the cellulose mixed ester has a total degree of substitution per anhydroglucose unit of about 2.9 to about 3.2, a degree of substitution per anhydroglucose unit by levulinyl ester groups of about 0.75 to about 1.9 and a degree of substitution per anhydroglucose unit by $C_2$-$C_6$ ester groups of about 1.1 to about 2.25.

Preferably the cellulose mixed ester of the first aspect of the invention has a weight average molecular weight (Daltons) of about 800 to about 105,000 and a total degree of substitution per anhydroglucose unit of about 2.9 to about 3.2, e.g. about 3.0 to about 3.1. More preferably the cellulose mixed ester has a weight average molecular weight of about 5000 to about 50000, e.g. about 5000 to 20000, and a total degree of substitution per anhydroglucose unit of about 2.9 to about 3.2, e.g. about 3.0 to about 3.1.

Preferably the cellulose mixed ester of the first aspect of the invention has a degree of polymerisation of from about 2 to about 250, e.g. from about 5 to about 200, e.g. from about 5 to about 100 e.g. from about 5 to about 30, and a total degree of substitution per anhydroglucose unit of about 2.9 to about 3.2, e.g. about 3.0 to about 3.1. In some embodiments, the degree of polymerisation is about 15 to about 50, e.g. about 20 to about 40, e.g. about 30 and the total degree of substitution per anhydroglucose unit of about 2.9 to about 3.2, e.g. about 3.0 to about 3.1.

Preferably the cellulose mixed ester of the first aspect of the invention has a total degree of substitution per anhydroglucose unit of about 2.5 to about 3.3, e.g. about 2.9 to about 3.2, e.g. about 3.0 to about 3.1, and a degree of substitution per anhydroglucose unit by levulinyl ester groups of about 0.5 to about 2.5, e.g. about 0.75 to about 1.9, e.g. about 0.8 to about 1.85.

Preferably all of the $C_2$-$C_6$ ester groups of the cellulose mixed ester of the first aspect of the invention are $C_3$, $C_4$, $C_5$ or $C_6$ ester groups. Alternatively preferably all of the $C_2$-$C_6$ ester groups of the cellulose mixed ester of the first aspect of the invention are acetyl, propionyl, isobutyryl, butyryl, valeryl or hexanoyl groups, more preferably acetyl ($C_2$), propionyl ($C_3$) or butyryl ($C_4$) groups, still more preferably butyryl ($C_4$) groups.

In a second aspect, the invention provides a cellulose mixed ester prepared as described in Example 1.1 below.

In a third aspect, the invention provides a cellulose mixed ester prepared as described in Example 1.2 below.

In a fourth aspect, the invention provides a cellulose mixed ester prepared as described in Example 1.3 below.

In a fifth aspect, the invention provides a cellulose mixed ester prepared as described in Example 1.4 below.

In a sixth aspect, the invention provides a cellulose mixed ester prepared as described in Example 2 below.

In a seventh aspect, the invention provides a cellulose mixed ester prepared as described in any one of Examples 7.1, 7.2 or 7.3 below.

In some embodiments of the first to fifth aspects of the invention, the cellulose mixed ester has a glass transition temperature ($T_g$) of about 45° C. to about 100° C., preferably about 50° C. to about 100° C., preferably about 50° C. to about 80° C., preferably about 60° C. to about 80° C. Preferably the $T_g$ is measured by differential scanning calorimetry (DSC).

In an eighth aspect, the invention provides a process for preparing a cellulose mixed ester, including the steps of:
(a) combining an alkyl carboxylic anhydride, levulinic acid and one or more acids selected from the group consisting of Brønsted acids; Lewis acids; or mixtures thereof of Lewis acids with Brønsted acids; and
(b) contacting the reaction mixture from step (a) with cellulose to produce a solution containing a cellulose mixed ester.

Preferably the Brønsted acids are selected from sulfuric acid, methanesulfonic acid, para-toluenesulfonic acid, and phosphoric acid. Preferably the Lewis Acids are selected from metal triflates, e.g. (Al(OTf)$_3$, Yb(OTf)$_3$, Gd(OTf)$_3$), or, when the Brønsted acid is phosphoric acid, a Lewis acid must be present.

Preferably, prior to step (b) the cellulose is contacted with water then an alkyl carboxylic acid such as acetic acid, propionic acid, butanoic acid, isobutanoic acid, pentanoic acid or hexanoic acid, preferably acetic acid, propionic acid or butanoic acid, more preferably acetic acid or butanoic acid, to produce a swollen cellulose which is the cellulose used in step (b).

Alternatively it is preferred that, prior to step (b), the cellulose is contacted with water, then an alkyl carboxylic acid such as acetic acid, propionic acid, butanoic acid, pentanoic acid or hexanoic acid, then levulinic acid, to produce a swollen cellulose which is the cellulose used in step (b).

It is further preferred that a chlorinated solvent is included in the reaction mixture in step (a). Preferably the chlorinated solvent is selected from the group consisting of dichloromethane, chloroform, and 1,2-dichlorethane.

Preferably the alkyl carboxylic anhydride is selected from the group consisting of acetic anhydride, propionic anhydride, isobutyric anhydride, butyric anhydride, valeric anhydride and hexanoic anhydride, more preferably acetic anhydride, propionic anhydride, isobutyric anhydride and butyric anhydride, still more preferably acetic anhydride and butyric anhydride.

Preferably the cellulose and the reaction mixture are heated at about 120° C. in step (b). More preferably the cellulose and the reaction mixture are heated at about 120° C., or to reflux if a chlorinated solvent is present, for about 2 to about 6 hours in step (b). Alternatively, the cellulose and the reaction mixture are heated using microwave energy in step (b).

The process optionally includes the step of:
(c) diluting the solution obtained in step (b) with an aqueous solution containing magnesium acetate, sodium acetate, acetic acid or sodium bicarbonate to produce a diluted solution containing the cellulose mixed ester.

The process optionally further includes the steps of:
(d) mixing the diluted solution obtained in step (c) with water; and
(e) recovering the cellulose mixed ester.

Preferably the cellulose mixed ester is recovered by filtration in step (e). The cellulose mixed ester may optionally be purified by dissolution in a solvent such as acetone or N-methylpyrrolidine, then precipitation of the cellulose mixed ester by adding water, and recovery of the cellulose mixed ester, for example by filtration.

In a ninth aspect, the invention provides a cellulose mixed ester having:
a total degree of substitution per anhydroglucose unit of about 2.9 to about 3.3;
residual hydroxyl functionality per anhydroglucose unit of 0 to about 0.5;
a degree of substitution per anhydroglucose unit by $C_2$-$C_6$ alkyl ester groups of about 0.5 to about 2.8;
a degree of substitution per anhydroglucose unit by $R^1$ ester groups of about 0.2 to about 2.6;
where $R^1$ is a radical of formula (i):

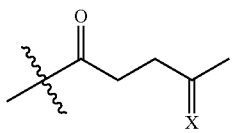

(i)

where each X in the cellulose mixed ester is independently selected from the group consisting of: O, N—O—$R^2$ and N—NH—C(=O)—$R^3$, where
$R^2$ is $CH_3(OCH_2CH_2)_2$, $CH_3(OCH_2CH_2)_3$, $CH_3(OCH_2CH_2)_{6-11}$, benzyl, alkyl or alkylcarboxy; and
$R^3$ is $CH_3(OCH_2CH_2)_2$, $CH_3(OCH_2CH_2)_3$, $CH_3(OCH_2CH_2)_{6-11}$;
provided that not all X groups in the cellulose mixed ester are O.

Preferably the cellulose mixed ester of the seventh aspect of the invention has a weight average molecular weight of about 2000 to about 105,000. More preferably the cellulose mixed ester has a weight average molecular weight of about 2500 to about 70,000. e.g. 15,000 to 40,000.

Preferably the cellulose mixed ester of the seventh aspect of the invention has a degree of polymerisation of from about 2 to about 250, e.g. from about 5 to about 200, e.g. from about 5 to about 100 e.g. from about 5 to about 30. In some examples, the degree of polymerisation is about 15 to about 50, e.g. about 20 to about 40, e.g. about 30.

In some embodiments of the seventh aspect of the invention, the cellulose mixed ester has a total degree of substitution per anhydroglucose unit of about 2.9 to about 3.2, e.g. about 3.0 to about 3.1.

In some embodiments of the seventh aspect of the invention, the cellulose mixed ester has a degree of substitution per anhydroglucose unit by $R^1$ ester groups of about 0.5 to about 2.5, e.g. about 0.75 to about 1.9.

In some embodiments of the seventh aspect of the invention, the cellulose mixed ester has a degree of substitution per anhydroglucose unit by $C_2$-$C_6$ ester groups of about 0.5 to about 2.5, e.g. about 1.1 to about 2.25.

Preferably the cellulose mixed ester of the seventh aspect of the invention has a degree of substitution per anhydroglucose unit by $R^1$ ester groups of about 0.75 to about 1.9 and a degree of substitution per anhydroglucose unit by $C_2$-$C_6$ ester groups of about 1.1 to about 2.25.

Preferably the cellulose mixed ester of the seventh aspect of the invention has a weight average molecular weight (Daltons) of about 2000 to about 105,000 and a total degree of substitution per anhydroglucose unit of about 2.9 to about 3.2, e.g. about 3.0 to about 3.1. More preferably the cellulose mixed ester has a weight average molecular weight of about 2500 to about 70000, e.g. about 15000 to about 40000, and a total degree of substitution per anhydroglucose unit of about 2.9 to about 3.2, e.g. about 3.0 to about 3.1.

Preferably the cellulose mixed ester of the seventh aspect of the invention has a degree of polymerisation of from about 2 to about 250, e.g. from about 5 to about 200, e.g. from about 5 to about 100 e.g. from about 5 to about 30, and a total degree of substitution per anhydroglucose unit of about 2.9 to about 3.2, e.g. about 3.0 to about 3.1. In some embodiments, the degree of polymerisation is about 15 to about 50, e.g. about 20 to about 40, e.g. about 30 and the total degree of substitution per anhydroglucose unit is about 2.9 to about 3.2, e.g. about 3.0 to about 3.1.

Preferably the cellulose mixed ester of the seventh aspect of the invention has a total degree of substitution per anhydroglucose unit of about 2.5 to about 3.3, e.g. about 2.9 to about 3.2, e.g. about 3.0 to about 3.1, and a degree of substitution per anhydroglucose unit by $R^1$ ester groups of about 0.5 to about 2.5, e.g. about 0.75 to about 1.9.

Preferably all of the $C_2$-$C_6$ ester groups of the cellulose mixed ester of the seventh aspect of the invention are $C_3$, $C_4$, $C_5$ or $C_6$ ester groups. Alternatively preferably all of the $C_2$-$C_6$ ester groups of the cellulose mixed ester of the seventh aspect of the invention are acetyl, propionyl, isobutyryl, butyryl, valeryl or hexanoyl groups, more preferably acetyl ($C_2$), propionyl ($C_3$) or butyryl ($C_4$) groups, still more preferably butyryl ($C_4$) groups.

In some embodiments of the seventh aspect of the invention, the cellulose mixed ester has a glass transition temperature ($T_g$) of from about −20° C. to about 45° C. Preferably the $T_g$ is measured by differential scanning calorimetry (DSC).

In a tenth aspect, the invention provides a cellulose mixed ester of formula (I):

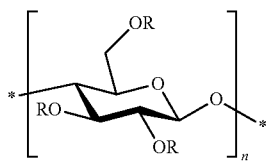

(I)

where:
n is an integer from 2 to 250; and
each R in the cellulose mixed ester is independently selected from the group consisting of H, $C_2$-$C_6$ acyl and levulinyl;
provided that not all R groups are H, and provided that not all R groups are $C_2$-$C_6$ acyl, and provided that not all R groups are selected from H and $C_2$-$C_6$ acyl.

In an eleventh aspect, the invention provides a cellulose mixed ester of formula (II):

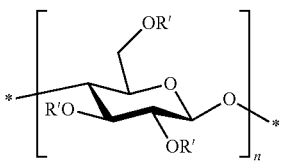

(II)

where:
n is an integer from 2 to 250; and
each R' in the cellulose mixed ester is independently selected from the group consisting of H, $C_2$-$C_6$ acyl and $R^1$;
where:
$R^1$ is a radical of formula (i)

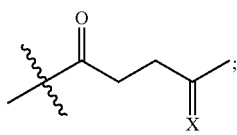

(i)

where each X in the cellulose mixed ester is independently selected from the group consisting of: O, N—O—$R^2$ and N—NH—C(=O)—$R^3$; each $R^2$ in the cellulose mixed ester is independently selected from the group consisting of $CH_3(OCH_2CH_2)_2$, $CH_3(OCH_2CH_2)_3$, $CH_3(OCH_2CH_2)_{6-11}$, alkyl, benzyl and alkcarboxy; and each $R^3$ in the cellulose mixed ester is independently selected from the group consisting of $CH_3(OCH_2CH_2)_2$, $CH_3(OCH_2CH_2)_3$ and $CH_3(OCH_2CH_2)_{6-11}$;
provided that not all R' groups are H, and provided that not all R' groups are $C_2$-$C_6$ acyl, and provided that not all R' groups are selected from H and $C_2$-$C_6$ acyl.

In some embodiments of the above formulae (I) and (II), n is an integer from about 2 to about 250, e.g. from about 5 to about 200, e.g. from about 5 to about 100 e.g. from about 5 to about 30. In some embodiments, the degree of polymerisation is about 15 to about 50, e.g. about 20 to about 40, e.g. about 30.

In some embodiments of the above formula (II), each X is independently selected from O and N—O—$R^2$. In these embodiments, some X groups in the cellulose mixed ester are 0 and some are N—O—$R^2$, such that not all X groups in the cellulose mixed ester are the same.

In some embodiments of the above formula (II), each X is independently selected from O and N—NH—C(=O)—$R^3$. In these embodiments, some X groups in the cellulose mixed ester are 0 and some are N—NH—C(=O)—$R^3$, such that not all X groups in the cellulose mixed ester are the same.

In some of the embodiments of the above formula (II), where the cellulose mixed ester comprises $R^1$ groups where X is O and $R^1$ groups where X is N—NH—C(=O)—$R^3$, about 50% to about 100% of the X groups in the cellulose mixed ester are N—NH—C(=O)—$R^3$.

In some of the embodiments of the above formula (II), where the cellulose mixed ester comprises $R^1$ groups where X is O and $R^1$ groups where X is N—O—$R^2$, about 50% to about 100% of the X groups in the cellulose mixed ester are N—O—$R^2$.

In some embodiments of the above formulae (I) and (II) the $C_2$-$C_6$ acyl group is a $C_3$, $C_4$, $C_5$ or $C_6$ ester group. Alternatively preferably the $C_2$-$C_6$ acyl group is acetyl, propionyl, isobutyryl, butyryl, valeryl or hexanoyl, more preferably acetyl ($C_2$), propionyl ($C_3$) or butyryl ($C_4$), still more preferably butyryl ($C_4$).

In still other embodiments of the above formula (II), the cellulose mixed ester comprises $R^1$ groups where X is O and $R^1$ groups where X is N—NH—C(=O)—$R^3$. In these embodiments, the $C_2$-$C_6$ acyl groups are preferably acetyl, propionyl or butyryl, more preferably acetyl or butyryl.

In yet other embodiments of the above formula (II), the cellulose mixed ester comprises $R^1$ groups where X is O and $R^1$ groups where X is N—O—$R^2$. In these embodiments, the $C_2$-$C_6$ acyl groups are preferably acetyl, propionyl or butyryl, more preferably acetyl or butyryl.

In some embodiments of the above formula (II), $R^2$ is $CH_3(OCH_2CH_2)_2$, $CH_3(OCH_2CH_2)_3$, $CH_3(OCH_2CH_2)_{6-11}$, benzyl, $C_{1-11}$alkyl, or $(CH_2)_{1-11}$ carboxy.

In some embodiments of the above formula (I), the cellulose mixed ester has a weight average molecular weight (Mw) of from about 5000 to about 50000, e.g. about 5000 to about 40000 e.g. about 5000 to about 30000, e.g. about 5000 to about 20000.

In some embodiments of the above formula (II), the cellulose mixed ester has a weight average molecular weight (Mw) of from about 25,000 to about 70,000 e.g. about 15,000 to about 40,000.

In some embodiments of the above formulae (I) and (II), the cellulose mixed ester has a degree of polymerisation of from about 2 to about 250, e.g. from about 5 to about 200, e.g. from about 5 to about 100 e.g. from about 5 to about 30. In some embodiments, the degree of polymerisation is about 15 to about 50, e.g. about 20 to about 40, e.g. about 30.

In some embodiments of the above formulae (I) and (II), the cellulose mixed ester has a total degree of substitution per anhydroglucose unit of about 2.9 to about 3.3, e.g. about 3.0 to about 3.2, e.g. about 3.1.

In some embodiments of the above formulae (I) and (II), the cellulose mixed ester has a residual hydroxyl functionality per anhydroglucose unit of 0 to about 0.4, e.g. 0 to about 0.3, e.g. 0 to about 0.2.

In some embodiments of the above formulae (I) and (II) the cellulose mixed ester has a degree of substitution per anhydroglucose unit of $C_2$-$C_6$ acyl groups of about 0.5 to about 2.8.

In some embodiments of the above formula (II) the cellulose mixed ester has a degree of substitution per anhydroglucose unit of $R^1$ groups of about 0.2 to about 2.6, e.g. about 0.5 to about 2.0, e.g. about 0.7 to about 1.5, e.g. about 0.82.

In some embodiments of the above formula (I) the cellulose mixed ester has a weight average molecular weight (Daltons) of about 800 to about 105,000 and a total degree of substitution per anhydroglucose unit of about 2.9 to about 3.2, e.g. about 3.0 to about 3.1. More preferably the cellulose mixed ester has a weight average molecular weight of about 5000 to about 50000, e.g. about 5000 to about 40000 e.g. about 5000 to about 30000 e.g. about 5000 to about 20000, and a total degree of substitution per anhydroglucose unit of about 2.9 to about 3.2, e.g. about 3.0 to about 3.1.

In some embodiments of the above formula (I) the cellulose mixed ester has a degree of polymerisation of from about 2 to about 250, e.g. from about 5 to about 200, e.g. from about 5 to about 100 e.g. from about 5 to about 30, and a total degree of substitution per anhydroglucose unit of about 2.9 to about 3.2, e.g. about 3.0 to about 3.1. In some embodiments, the degree of polymerisation is about 15 to about 50, e.g. about 20 to about 40, e.g. about 30 and the total degree of substitution per anhydroglucose unit of about 2.9 to about 3.2, e.g. about 3.0 to about 3.1.

In some embodiments of the above formula (I) the cellulose mixed ester has a total degree of substitution per anhydroglucose unit of about 2.5 to about 3.3, e.g. about 2.9 to about 3.2, e.g. about 3.0 to about 3.1, and a degree of substitution per anhydroglucose unit by levulinyl ester groups of about 0.5 to about 2.5, e.g. about 0.75 to about 1.9, e.g. about 0.8 to about 1.85.

In some embodiments of the above formula (II) the cellulose mixed ester has a weight average molecular weight (Daltons) of about 2000 to about 105,000 and a total degree of substitution per anhydroglucose unit of about 2.9 to about 3.2, e.g. about 3.0 to about 3.1. More preferably the cellulose mixed ester has a weight average molecular weight of about 2500 to about 70000, e.g. about 15000 to about 40000, and a total degree of substitution per anhydroglucose unit of about 2.9 to about 3.2, e.g. about 3.0 to about 3.1.

In some embodiments of the above formula (II) the cellulose mixed ester has a degree of polymerisation of from about 2 to about 250, e.g. from about 5 to about 200, e.g. from about 5 to about 100 e.g. from about 5 to about 30, and a total degree of substitution per anhydroglucose unit of about 2.9 to about 3.2, e.g. about 3.0 to about 3.1. In some embodiments, the degree of polymerisation is about 15 to about 50, e.g. about 20 to about 40, e.g. about 30 and the total degree of substitution per anhydroglucose unit of about 2.9 to about 3.2, e.g. about 3.0 to about 3.1.

In some embodiments of the above formula (II) the cellulose mixed ester has a total degree of substitution per anhydroglucose unit of about 2.5 to about 3.3, e.g. about 2.9 to about 3.2, e.g. about 3.0 to about 3.1, and a degree of substitution per anhydroglucose unit by $R^1$ ester groups of about 0.5 to about 2.5, e.g. about 0.75 to about 1.9.

In some embodiments of the above formula (II) the cellulose mixed ester has a glass transition temperature ($T_g$) of from about −20° C. to about 45° C. In some embodiments of the above formula (I) the cellulose mixed ester has a glass transition temperature ($T_g$) of about 45° C. to about 100° C., preferably about 50° C. to about 100° C., preferably about 50° C. to about 80° C., preferably about 60° C. to about 80° C. Preferably the $T_g$ is measured by differential scanning calorimetry (DSC).

In a twelfth aspect, the invention provides a composition comprising one or more cellulose mixed esters of the invention, e.g. one or more cellulose mixed esters of the first, second, third, fourth, fifth, eighth, ninth, tenth or eleventh aspect of the invention, as defined above. Preferably the composition comprises more than one cellulose mixed ester as defined above.

In a thirteenth aspect, the invention provides a coating composition comprising one or more cellulose mixed esters of the invention, e.g. one or more cellulose mixed esters of the first, second, third, fourth, fifth, seventh, eighth, ninth, tenth or eleventh aspect of the invention, as defined above. The coating composition may further comprise one or more solvents. The solvents may be selected from the group consisting of water, ketones, esters, glycol ethers, alkyl pyrrolidones and DMSO. The coating composition may optionally comprise one or more additives such as surface wetters, levelling agents, waxes, silicones, biocides, defoamers, anticorrosive pigments, UV absorbers, crosslinking agents and/or rheology modifiers.

The coating composition may be a paint composition.

In a fourteenth aspect, the invention provides a method for preparing a cellulose mixed ester of formula (II) as defined above, including the step of:
(a) reacting a cellulose mixed ester of formula (I) as defined above with an alkoxyamine or an aryloxyamine or an acyl hydrazide to produce a cellulose mixed ester of formula (II).

It will be appreciated that any of the sub-scopes disclosed herein, e.g. with respect to total degree of substitution, residual hydroxyl functionality, degree of substitution per anhydroglucose unit by $C_2$-$C_6$ ester groups and/or degree of substitution per anhydroglucose unit by levulinyl ester groups; or e.g. with respect to total degree of substitution, residual hydroxyl functionality, degree of substitution per anhydroglucose unit by $C_2$-$C_6$ ester groups and/or degree of substitution per anhydroglucose unit by $R^1$ ester groups; or e.g. with respect to n and/or R; or e.g. with respect to n, R', X, $R^1$, and/or $R^2$; may be combined with any of the other sub-scopes disclosed herein to produce further sub-scopes.

DETAILED DESCRIPTION

As used hereinafter, the term "cellulose-levulinyl mixed esters" refers to cellulose derivatives containing the levulinyl moiety, e.g. as described by formula (I) as defined above. As used hereinafter, the term "cellulose mixed ester derivatives" refers to cellulose-levulinyl mixed esters where a proportion of the levulinyl moiety has been further derivatised, e.g. as described by formula (II) as defined above.

The skilled person will appreciate that not all R or R' groups of the cellulosic polymer of formula (I) or formula (II) are H, and not all R or R' groups are $C_2$-$C_6$ acyl, and not all R or R' groups are H or $C_2$-$C_6$ acyl, but that the cellulosic polymer comprises at least some degree of substitution by levulinyl or $R^1$ ester groups.

Those skilled in the art will recognise that other methodologies for the synthesis of a mixed or homogeneous cellulose ester polymer are applicable [Mulzer, Section 2.2 "Synthesis of Esters, Activated Esters and Lactones", and in Trost and Fleming, "Comprehensive Organic Synthesis" Volume 6 (1991). For example, the use of sodium levulinate and/or other carboxylic acid salts in a suitable solvent and/or the presence of additional base and/or activating agents. Or, for example the use of levulinyl-halides such as levulinyl chloride and/or other halide-acids as the esterifying agents to produce cellulosic ester derivatives.

The skilled person will also appreciate that the end groups of the cellulose mixed esters of the invention, e.g. those of formula (I) or formula (II), may also be esterified.

The present invention relates to cellulose-levulinyl mixed esters which are useful as starting materials for producing a variety of cellulose mixed ester derivatives.

The cellulose-levulinyl mixed esters all comprise $C_2$-$C_6$ acyl groups, such as acetyl, propionyl or butyryl groups, randomly substituted on the anhydroglucose units of the cellulose backbone, to give $C_2$-$C_6$ ester functionalities. The cellulose-levulinyl mixed esters further comprise levulinyl groups, randomly substituted on the anhydroglucose units of the cellulose backbone, to give levulinyl ester functionalities. The cellulose mixed ester derivatives further comprise levulinyl groups and radicals of either formula (a) or formula (b), randomly substituted on the anhydroglucose units of the cellulose backbone, to give levulinyl ester functionalities and levulinyl derivative functionalities. Alternatively, the cellulose mixed ester derivatives further comprise radicals of either formula (a) and/or formula (b), randomly substituted on the anhydroglucose units of the cellulose backbone to give levulinyl derivative functionalities:

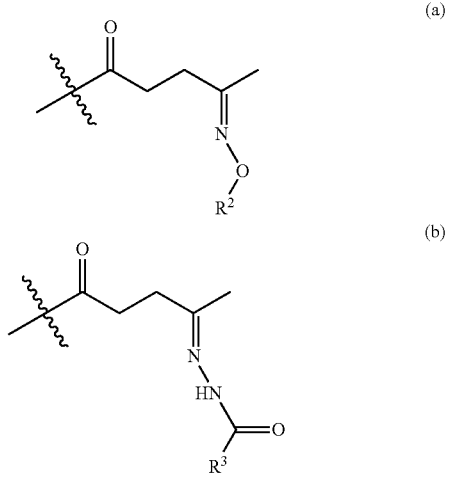

where $R^2$ and $R^3$ are as defined in formula (II).

The cellulose mixed ester derivatives and, indeed, the cellulose-levulinyl mixed ester starting materials themselves can be used in a variety of applications, such as coatings applications. The invention also provides processes for the production of cellulose-levulinyl mixed ester starting materials and for the production of cellulose mixed ester derivatives from these starting materials.

Some of the cellulose mixed ester derivatives that can be produced using the starting materials and processes of the invention advantageously have glass transition temperatures that fall within the range −20-45° C. This makes them particularly suited to coatings applications such as water-borne coatings, and film formation of these coatings can occur at ambient temperatures without the need for plasticisers or coalescing solvents.

A further advantage of the introduction to a cellulose ester of a ketone functionality is that in addition to further modification of the polymers solubility, hydrophobicity, glass transition temperature and other physical characteristics is that it provides chemical functionality suitable for cross-linking with conventional industry-standard film-modifiers such as adipic acid dihydrazide.

Thus, the invention provides an entirely new route to a wide range of different cellulose mixed ester derivatives. The invention also relates to coatings comprising these derivatives as binders.

Advantageously, the cellulose-levulinyl mixed esters and the cellulose mixed ester derivatives are derived from renewable resources.

The invention further provides methods for lowering the glass transition temperatures of cellulose-levulinyl mixed esters by reaction, with a suitable reagent, of the pendant carbonyl groups located on the levulinyl ester groups, to produce cellulose mixed ester derivatives which can have lower glass transition temperatures than the starting material. Thus, the invention also provides a route to the synthesis of a variety of cellulose mixed ester derivatives, having glass transition temperatures that allow for film formation to occur at ambient temperatures without the need for plasticisers or coalescing solvents. The applicant has therefore shown that it is possible to chemically modify cellulose-levulinyl esters to manipulate and modify their glass transition temperatures.

Those skilled in the art will appreciate that the cellulose-levulinyl mixed esters can undergo a wide variety of transformations. For example, the pendant carbonyl groups can undergo reactions to form the following functional groups: alkyloxyamines, aryloxyamines and acyl hydrazides, alkylated and arylated derivatives, reduced derivatives, alkyl acids, alkyl phosphates, sulfates, thioesters, acetals, α-halogenated derivatives or alkenes.

Those skilled in the art will also realise that the range of cellulose mixed ester derivatives encompassed by the invention is not limited to those having the above-mentioned functional groups. However, in some preferred embodiments of the invention, the cellulose mixed ester derivatives have functional groups that are carbonyl derivatives, for example oxime or acyl hydrazide derivatives.

As described above, the cellulose-levulinyl mixed esters of the invention are useful starting materials for the preparation of other cellulose mixed ester derivatives and, in some cases, are themselves useful, for example, as the binder in coatings applications.

Comparative experiments on the reaction of cellulose with levulinic acid and with other similar sized alkyl acids surprisingly show that the level of incorporation of the levulinyl group in the cellulose mixed ester products is approximately twice the level of incorporation of other similar sized alkyl acids (shown as $D_{Acyl}$ in Table 1). This enhanced incorporation of the levulinyl group is unexpected, and an understanding of the mechanism of this reaction would be advantageous as it would allow for fine-tuning of the reaction conditions to produce cellulose-levulinyl mixed esters having the desired degrees of substitution.

TABLE 1

Comparison of Levulinic Acid Incorporation to Alkyl $C_4$-, $C_5$- and $C_6$-acids Incorporation[1,2]

| Acid | Number of Carbons | $D_{Acyl}$ |
|---|---|---|
| Levulinic | 5 | 1.29 |
| Butyric | 4 | 0.74 |
| Valeric | 5 | 0.67 |
| Hexanoic | 6 | 0.56 |

[1]Total $D_s$ for all 3.05-3.1. Acid to acetic anhydride molar ratio 1:1.33.
[2]The $D_{acyl}$ is calculated from products exemplified in Example 1.2 and Examples 2 through 6.

The applicant has found that the mechanism of the reaction of cellulose and levulinic acid in the presence of acetic anhydride and a strong acid catalyst proceeds via activated lactones. A solution of acetic anhydride, levulinic acid and catalytic sulfuric acid rapidly forms, in an exothermic reaction, acetyl (5) and levulinyl (6) activated lactones with trace β-angelica lactone (4), as determined by NMR spectroscopy (Scheme 1).

α-Angelica lactone (3) may be recovered from the reaction mixture by vacuum distillation but β-angelica lactone (4) is the only species observed in the reaction mixture, which suggests that (3) is the kinetic product whilst (4) may be considered the thermodynamic product.

solution (see Table 1 above). This suggests the cellulose dissolution and propensity to react is enhanced by this reactive solution compared to a simple or mixed anhydride solution of other similar sized alkyl acids. Prior to the present invention, it was entirely unexpected that such an enhancement would be observed. Thus, it is possible, using the process of the present invention, to monitor and fine-tune the reaction conditions to produce cellulose-levulinyl ester starting materials having degrees of substitution that fall in the desired range.

Thus, the use of the active ester mixture of (5) and (6) with trace (3) and (4), is a highly effective acylating agent and provides a novel and facile route to the cellulose-

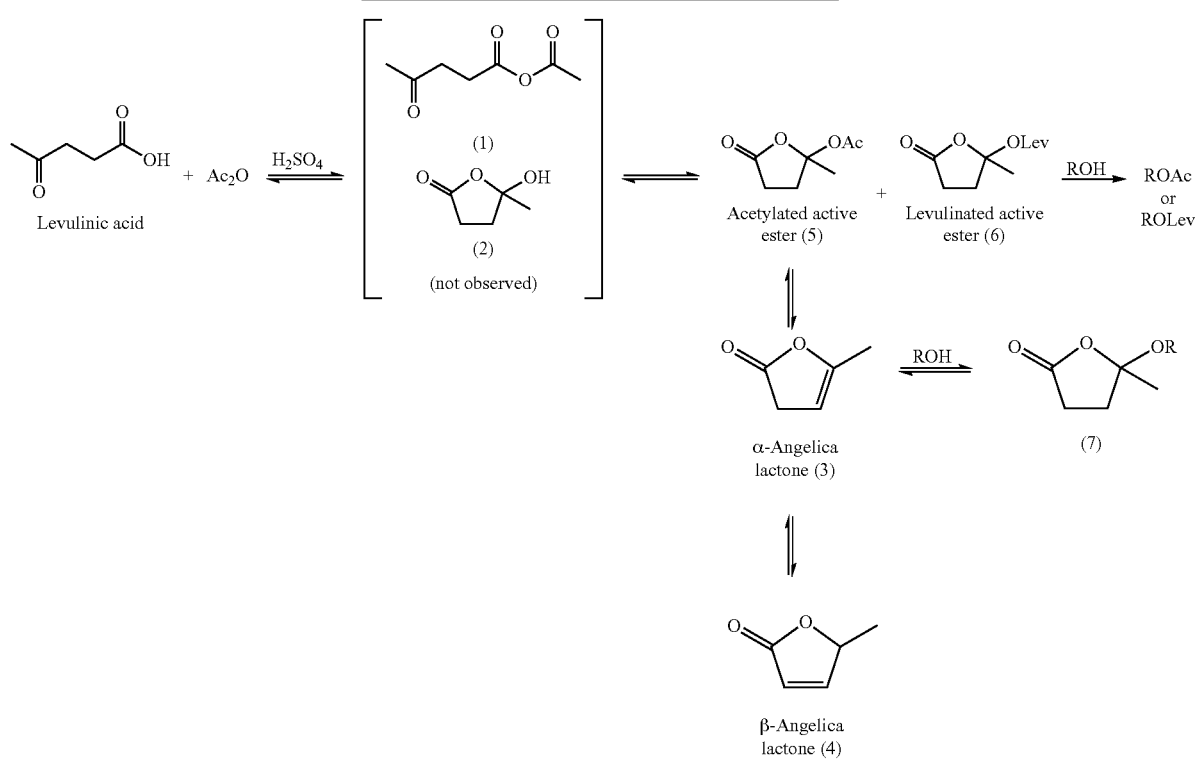

Scheme 1. Proposed active ester species formed with levulinic acid, acetic anhydride and catalytic strong acid.[1]

[1] Where R represents the cellulose polymer, alternative polyols, organic or inorganic species.

Species (2), reported as pseudo-levulinic acid (R H Leonard, Industrial and Engineering Chemistry, 48(8), 1330-1341 (1956)) and the mixed anhydride (1) (or for that matter levulinic anhydride) are not observed in the above reaction mixture (by NMR). Species (2) has previously been postulated as an intermediate or equilibrium species formed from levulinic acid (U.S. Pat. No. 2,809,203; B V Timokhin, V A Baransky, G D Eliseeva, Russian Chemical Reviews, 68(1), 73-84 (1999)). Furthermore, under dehydrating conditions it would not be likely that this species reforms from the activated esters (5) and (6).

The mixture of active lactones (5) and (6) and in trace amounts the angelica lactones (3) and (4), in the presence of catalytic sulfuric acid, has a greater capacity for the inclusion of the levulinyl ester moiety in the cellulose ester than an equivalent mixed acetic/alkyl carboxylic acid anhydride levulinyl mixed ester starting materials of the invention. Without wishing to be bound by theory, the applicant postulates that reaction of cellulose hydroxyl groups with acylated active ester (5) at the lactone carbonyl generates a levulinated cellulose ester with concomitant expulsion of acetic acid. In a similar fashion, reaction at the acetyl carbonyl acetylates cellulose, releasing levulinic acid.

Preparation of cellulose-levulinyl mixed esters through the use of the activated lactones as shown in Scheme 1 results in a cellulose-levulinyl polymer having an off-white to brown appearance. The dissolution of the cellulose into the reaction mixture and degree of esterification are dependent on reaction volume, proportion and type of reagents, acid catalyst amount and type, effectiveness of cellulose pre-swelling, temperature and reaction stirring. The following are some preferred conditions for the preparation of cellulose-levulinyl mixed esters:

TABLE 2

Variables in the levulinyl esterification of cellulose

| Variable | Preferred Conditions |
|---|---|
| Cellulose swelling | Pre-swelling that completely immerses the cellulose in the solvent. Stirring for 2-16 hours. Two solvent treatments including water, then acetic acid, then additional treatments as required by the desired product. |
| Proportion of acid catalyst | Increased proportions enhance rate of acetolysis and generation of smaller chain (lower degree of polymerisation) cellulose mixed esters. Increased proportions decrease cellulose mixed ester yield. Preferred proportion: about 0.01-10 mol % per anhydroglucose unit. |
| Acid catalyst type | Preferred Brønsted acids: sulfuric acid or sulfonic acids such as methanesulfonic or paratoluene sulfonic acid; or phosphoric acid ($H_3PO_4$ must be used in combination with a Lewis acid). Preferred Lewis acids: A Lewis Acid such as a metal triflate e.g. $Al(OTf)_3$, $Yb(OTf)_3$ or $Gd(OTf)_3$ that may be enhanced by the addition of a Brønsted acid, e.g. $H_3PO_4$. |
| Temperature | Preferred temperature: less than about 120° C. Most preferred temperature range: 40-85° C. |

[2]Reaction rate is arbitrarily defined as the observed rate of cellulose dissolution into the reaction mixture. A rapid reaction of suitably pre-swelled cellulose is considered to be effected in <30 minutes, whilst a slow reaction is considered to take 16 hours.

The process of preparing the cellulose-levulinyl ester starting materials optionally includes the use of a co-solvent such as a chlorinated solvent. The presence of the co-solvent can reduce colour generation and speed the dissolution and esterification of the cellulose polymer. It has not previously been reported that such co-solvents can enhance the levulinyl activated-ester esterification of cellulose. The chlorinated solvents dichloromethane (DCM, BP 40° C.), chloroform (BP 61° C.), and 1,2-dichlorethane (DCE, BP 84° C.) or chlorinated solvents of higher boiling point can be used in the process. With decreased reaction temperature, complete dissolution typically requires longer reaction times (e.g. 16 hours for DCM compared to 0.4-2 hours for DCE).

Under low acid, lower temperature (<80° C.), shorter reaction time (<30 minutes) or in the presence of low-boiling point co-solvents (e.g. DCM) a third species (7) (as shown in Scheme 1) may be observed as a constituent in the cellulose-levulinyl ester. The presence of this species is evidenced by two distinctive broad methyl resonances in the $^1H$ NMR spectrum (CDCl$_3$), observed at δ 1.55 and 1.65 ppm, that have a clear H—C correlation to methyl carbon resonances δ 25.1 and 23.1 ppm, respectively. In addition, an unexpected quaternary resonance at δ $^{13}C$ 109.4 ppm, that has long range H—C correlations to the aforementioned methyl groups, is consistent with a methyl-lactone moiety on the cellulosic polymer. FIG. 5 shows the $^1H$ NMR spectrum of the reaction product of pre-swelled cellulose with levulinic acid, acetic anhydride, sulfuric acid and 1,2-dichloroethane for minimum reaction time to effect dissolution. FIG. 5 graphically demonstrates the assignment for each proton signal in the spectrum. The methyl-keto groups in the acetate and levulinate esters overlap and cannot be assigned unambiguously to the four peaks observed at δ $^1H$ 1.8-2-2 ppm. The spectrum is indicative of approximately one levulinyl ester per anhydroglucose units, and one methyl lactone per two anhydroglucose units. The identity of the moiety on each of the C2, C3 and C6 positions is not specified. The presence of the cellulose-lactone constituent in the reaction mixture indicates that the activated lactones are indeed the acylating moieties involved in the reaction.

As discussed above, many factors affect the reaction product. Thus, for a reaction completed with effective stirring and for the minimum time to effect cellulose dissolution with DCE present a significant amount of lactone moiety is observed on the cellulose polymer, whilst for a longer reaction time without stirring in the same reaction mixture very little lactone is observed on the cellulose polymer. This suggests that the methyl lactone may be considered the kinetic product whilst ester linkage is the thermodynamic product. Similarly, lower temperature reactions or short time reactions tend to increase the relative amount of the lactone moiety.

The applicants have shown that the above-described reaction chemistry can successfully be applied not only to $C_2$ esters, but also to higher alkyl acids in conjunction with the incorporation of the levulinyl group through active ester chemistry. Thus, the above description of the preferred conditions for the cellulose-acetyl levulinyl mixed ester also applies to the reaction with higher alkyl acids. In a similar fashion to the preparation of a cellulose-acetyl levulinyl mixed ester, the higher mixed esters of propionic, butyric, isobutyric, valeric and hexanoic acid demonstrate the applicability of this invention (Table 3).

TABLE 3

Mixed cellulose-levulinyl esters

| Alkyl ester | $D_{Tot}$ | $D_{Lev}$ | Tg/° C. |
|---|---|---|---|
| Propionyl | 3.07 | 1.84 | 76 |
| Butyryl | 2.93 | 1.80 | 61 |
| iso-Butyryl | 3.04 | 2.45 | 62 |
| Valeryl | 3.13 | 2.03 | 45 |
| Hexanoyl | 2.95 | 2.04 | 54 |

The applicants have found that the $T_g$ of the higher mixed esters decreases with increasing number of carbons on the alkyl ester group, appearing to reach a minimum at a valeryl ($C_5$)-levulinyl cellulosic mixed ester. Advantageously, the present invention therefore provides cellulose mixed esters which have surprisingly low $T_g$, making them suitable and desirable starting materials for the preparation of cellulose mixed ester derivatives, and indeed for use themselves, for example in coatings applications. Clearly this significant decrease in $T_g$ provides an advantage in that significantly less amelioration by further $T_g$ lowering modification is required.

A key component of the ketone permitting further modification is the introduction of acid functionality which promotes forming a stable dispersion and/or emulsion. A further inventive step we have discovered is that the inclusion of a carboxy functionality appears to impart room-temperature film formation even with a relatively high $T_g$. This may be due to partial solubility of the species in water. Hence having the levulinyl ketone permits a film-forming product even when the $T_g$ is high if it is suitably modified. An example is demonstrated in our current state-of-the-art in examples 13.3 and 13.4.

Preferred embodiments of the invention are propionyl, butyryl and/or iso-butyryl—levulinyl cellulose mixed esters and propionyl, butyryl and/or iso-butyryl—levulinyl cellulose mixed ester derivatives, most preferably butyryl or iso-butyryl-levulinyl cellulose mixed esters and butyryl or iso-butyryl—levulinyl cellulose mixed ester derivatives. These mixed esters provide the following additional advantages: relative ease of manufacture, low cost of materials and comparative ease of work-up and product preparation.

The cellulose mixed esters are soluble in a variety of solvents, including those that are typically used in coating compositions. Solvents in which the cellulose mixed esters are soluble include ethyl cellosolve, cyclohexanone, chloroform, dibasic ester, N-methylpyrrolidone, pyridine, dioxane, acetone, acetic acid, acetic anhydride, tetrahydrofuran, dimethylsulfoxide, dimethylacetamide, butyl lactate, diacetone alcohol, ethyl acetate, methanol, dimethylformamide, methyl ethyl ketone and dichloromethane. Typically the cellulose mixed esters are soluble to at least 10% w/v in these solvents.

The cellulose mixed esters of the invention are useful, for example, as the principal film forming binders in coating compositions. Advantageously, these compositions can be formulated without additional plasticisers or coalescing solvents, as the glass transition temperatures of the esters allow for film formation at ambient temperatures.

Thus, the cellulose mixed esters of the invention are particularly useful in coating compositions such as paint, especially waterborne formulations such as low VOC paint formulations.

The invention therefore relates to coating compositions comprising the cellulose mixed esters of the invention. Typically, such compositions will include one or more cellulose mixed esters of the invention, together with one or more suitable solvents, such as organic solvents and water, e.g. polar organic solvents. Suitable solvents include, but are not limited to, ketones, esters, glycol ethers, alkyl pyrrolidones, DMSO and other polar and/or oxygenated solvents known to those skilled in the art. The inclusion of water at suitable levels in the composition affords a dispersion of the invention suitable for formulation of waterborne coatings.

A typical coating composition comprises about 10% to about 60% by weight, preferably about 20% to about 50% by weight, e.g. about 28% or about 43% by weight of the one or more cellulose mixed esters of the invention. A solventborne coating composition may also comprise from about 20% to about 50% by weight, preferably about 30% to about 40% by weight, e.g. about 33% by weight or about 34.5% by weight of a suitable solvent. Other additives may also be present. For example, a typical paint composition may also include titanium dioxide, e.g. about 20% to about 30% by weight, preferably 21% to 23% by weight.

A solventborne gloss paint composition comprising one or more cellulose mixed esters of the invention will typically comprise, as solvent, a mixture of ethyl acetate, butyl acetate, N-methyl-2-pyrrolidone (NMP), cyclohexanone and/or methyl dibasic esters (e.g. dimethyl adipate, dimethyl glutarate and dimethyl succinate (approximately 17:66:17% by mass). A waterborne gloss paint composition comprising one or more cellulose mixed esters of the invention will typically comprise a dispersion of the cellulose mixed ester in water and optionally a suitable co-solvent such as a polar organic solvent. Suitable polar organic solvents include, but are not limited to, ketones, esters, glycol ethers, alkyl pyrrolidones, DMSO and other polar and/or oxygenated solvents known to those skilled in the art. Optionally one or more other additives such as surface wetters, levelling agents, waxes, silicones, biocides, de-foamers, anticorrosive pigments, UV absorbers and rheology modifiers may be added to both solventborne or waterborne compositions. In one embodiment, a paint composition comprising one or more cellulose mixed esters of the invention also comprises a 50:50 mixture of cyclohexanone and methyl dibasic esters (dimethyl adipate, dimethyl glutarate and dimethyl succinate (approximately 17:66:17% by mass)), titanium dioxide, bentonite clay and soya lecithin. In another embodiment, a paint composition comprising one or more cellulose mixed esters of the invention also comprises water, titanium dioxide, anionic dispersants and antimicrobial agents.

Other gloss paint compositions may be produced through dissolution or dispersion of one or more cellulose mixed esters of the invention in a suitable solvent(s), followed by addition of universal tinters. One or more additives such as surface wetters, levelling agents, waxes, silicones, biocides, de-foamers, anticorrosive pigments, UV absorbers and rheology modifiers can be incorporated to enhance or improve specific properties.

In addition, modification through blending with other film-forming polymers is possible.

Gloss can be reduced through incorporation of extender pigments including silica, alkali/alkaline earth metal silicates, calcium carbonate, kaolin, mica and talc as known to those skilled in the art of paint formulation.

In another embodiment, a paint composition comprising one or more cellulose mixed esters of the invention also comprises a 50:50 mixture of cyclohexanone and methyl dibasic esters (dimethyl adipate, dimethyl glutarate and dimethyl succinate (approximately 17:66:17% by mass)), titanium dioxide, bentonite clay, soya lecithin and nepheline syenite.

A coating composition comprising one more cellulose mixed esters of the invention can be used to coat a variety of substrates, for example wood, metal, pre-coated substrates, plastics and glass. The invention therefore further relates to a coated substrate which is coated with a coating composition comprising one or more cellulose mixed esters of the invention. Such substrates can include wood, metal, pre-coated substrates, plastics and glass.

General Synthetic Methods

The cellulose-levulinyl mixed esters of the invention can be prepared according to the following general methods. Those skilled in the art will appreciate that cellulose can be obtained from a variety of sources such as wood pulp, cotton linters, recycled cellulosic materials such as paper and cardboard or vegetable fibres such as corn fibre.

Step a)—Swelling

Cellulose (e.g. microcrystalline cellulose, mechanical or Kraft wood pulp) is stirred in warm water for 2-4 h and then filtered. This process is repeated if necessary. The swollen cellulose is then stirred in warm acetic acid for 1-4 hours and filtered and this process is repeated. This cellulose is used for the preparation of mixed esters in which the degree of substitution of levulinyl is less than approximately 1.5 levulinyl units per anhydroglucose unit ($D_{lev}$<1.5). For preparation of esters with higher levulinyl substitution the acetic acid wet cellulose is stirred in warm levulinic acid and filtered, and then this process is repeated. For preparation of esters that do not include acetate functionality the acetic acid wet cellulose is stirred with either warm levulinic acid, or the relevant acid, and filtered, and then this process is repeated.

Step b)—Reaction

Swollen cellulose is added to a solution of alkyl anhydride, (6-12 eq per anhydroglucose unit), levulinic acid (9-18 eq) and sulfuric acid (15-45 meq) (alternatively, methanesulfonic acid or para-toluenesulfonic acid can be used) and the mixture is heated to 120° C. for 4-24 hours. Alternative order of addition can be completed. For example a reaction mixture of alkyl anhydride, levulinic acid and sulfuric acid can be prepared before charging the cellulose to the reaction. This permits moderation of any exotherm from combination of the reagents. Those skilled in the art will appreciate that the choice of alkyl anhydride will depend on the desired $C_2$-$C_6$ acyl group. For example, acetic anhydride is used to prepare cellulose mixed esters comprising an acetyl group, and propionic anhydride is used to prepare cellulose mixed esters comprising a propionyl group.

Alternative Step b)—Reaction Using Chlorinated Solvent

A reaction mixture is prepared that contains alkyl anhydride (0.7 parts, 28 g), levulinic acid (1 part, 40 g), sulfuric acid ($1.55 \times 10^{-6}$ parts, conc, 62 uL) and a chlorinated solvent such as 1,2-dichloroethane (1.33 parts, DCE, 53 g). Those skilled in the art will appreciate that the choice of alkyl anhydride will depend on the desired $C_2$-$C_6$ acyl group. For example, acetic anhydride is used to prepare cellulose mixed esters comprising an acetyl group, and propionic anhydride is used to prepare cellulose mixed esters comprising a propionyl group. Swollen cellulose (1.24 g cellulose, 4 g AcOH-wet cellulose) is reacted with 40.6 g of the reaction mixture solution (4 eq anhydride). The reaction mixture is heated with stirring to reflux and after 60 minutes the solution is cooled. The chlorinated solvent is evaporated before Step c).

Step c)—Work Up

The cooled reaction mixture is diluted with a solution of magnesium or sodium acetate or sodium bicarbonate (0.4 eq) in water (50-100 eq) and acetic acid (15-30 eq). This mixture is poured into water (5-20 volumes) and stirred vigorously for 1-4 hours. The precipitate is filtered, washed twice with water and dried to give the levulinyl cellulose mixed ester. If necessary the wet material can be further purified by dissolution in a suitable solvent, e.g. acetone (alternatively, N-methylpyrrolidine can be used), and re-precipitation into water.

Alternative Step c)—Work Up of Chlorinated Solvent Reaction

The crude product is diluted with an acidified aqueous solution containing $Mg(OAc)_2$ then poured into a 20% ethanol in water solution. After filtration the product is washed with 20% ethanol in water.

The cellulose-levulinyl mixed esters of the invention typically have weight average molecular weights (Mw) (when deacylated) of about 4000 to about 11000. The molecular weights of the cellulose-levulinyl mixed esters can be determined by high performance size exclusion chromatography coupled with multi-angle laser light scattering (SEC-MALLS) or refractive index detection (SEC-RI). Typically the degree of polymerisation of the cellulose-levulinyl mixed esters is about 20 to about 70 but can vary from about 2 to about 3500.

The above general reaction conditions can be used to produce cellulose-levulinyl mixed esters with a total degree of substitution per anhydroglucose ($D_s$) of about 2.8 to about 3.4, a degree of substitution per anhydroglucose of levulinyl groups ($D_{lev}$) of about 0.2 to about 2.6, a degree of substitution per anhydroglucose of $C_2$-$C_6$ acyl groups ($D_{Acyl}$) of about 0.5 to about 2.8 and a degree of substitution per anhydroglucose of hydroxyl groups ($D_{OH}$) of 0 to about 0.5 which, when deacylated, have weight average molecular weights ($M_w$) of about 5400 to about 11000 and degrees of polymerisation, ($D_p$) of about 30 to about 70.

Advantageously, these cellulose-levulinyl mixed esters, e.g. the mixed ester LAC-1 described in Example 1, can be further manipulated by chemical modification of the carbonyl group of the levulinyl moiety. For example, levulinyl cellulose mixed esters can be reacted with an aryloxyamine such as benzyloxyamine or an alkoxyamine of general formula $R^2$—O—$NH_2$, or with an acyl hydrazide of formula $R^3$—C(=O)—NH—$NH_2$, where $R^2$ and $R^3$ are as defined above.

Typically, the levulinyl cellulose mixed ester, e.g. the mixed ester LAC-1, is dissolved in a suitable solvent such as chloromethane or ethyl acetate and the solution is contacted with an aryloxyamine or an alkoxyamine ($R^2$—O—$NH_2$) or an acyl hydrazide ($R^2$—C(=O)—NH—$NH_2$) and a suitable acid such as acetic acid. Suitable aryloxyamines, alkoxyamines and acyl hydrazides are described in the Examples section. The reaction is stirred, e.g. at room temperature, and monitored, for example by TLC, to determine when all of the aryloxyamine, alkoxyamine or acyl hydrazide has reacted. The reaction mixture is readily worked up by evaporation of the solvent to give the desired levulinyl oxime or a levulinyl acyl hydrazide mixed ester.

DEFINITIONS

The term "degree of polymerisation" refers to the number of anhydroglucose units that are β1-4 linked in the cellulosic polymer chain.

The term "degree of substitution" refers to the level to which the three alcohol sites on the cellulosic polymer are substituted with ester functionality. Those skilled in the art will understand that, for short polymer chains, the total degree of substitution can rise above three due to end group contribution.

The term "residual hydroxyl functionality per anhydroglucose unit" refers to the number of hydroxyl groups per anhydroglucose unit of the cellulosic polymer.

The term "alkyl" means any saturated hydrocarbon radical having up to 30 carbon atoms and includes any $C_1$-$C_{25}$, $C_1$-$C_{20}$, $C_1$-$C_{15}$, $C_1$-$C_{10}$, or $C_1$-$C_6$ alkyl group, and is intended to include both straight- and branched-chain alkyl groups, and to exclude cyclic alkyl groups. Examples of alkyl groups include: methyl group, ethyl group, n-propyl group, iso-propyl group, n-butyl group, iso-butyl group, sec-butyl group, t-butyl group, n-pentyl group, 1,1-dimethylpropyl group, 1,2-dimethylpropyl group, 2,2-dimethylpropyl group, 1-ethylpropyl group, 2-ethylpropyl group, n-hexyl group and 1-methyl-2-ethylpropyl group.

The term "alkylene" means any saturated hydrocarbon radical having up to 30 carbon atoms and includes any $C_1$-$C_{25}$, $C_1$-$C_{20}$, $C_1$-$C_{15}$, $C_1$-$C_{10}$, or $C_1$-$C_6$ alkylene group, and is intended to include both straight- and branched-chain alkylene groups. Examples of alkylene groups include: methylene (—$CH_2$—) group, ethylene [(—$CH_2$—)$_2$] group, n-propylene [(—$CH_2$—)$_3$] group, iso-propylene group, n-butylene group, iso-butylene group, sec-butylene group, t-butylene group, n-pentylene group, 1,1-dimethylpropylene group, 1,2-dimethylpropylene group, 2,2-dimethylpropylene group, 1-ethylpropylene group, 2-ethylpropylene group, n-hexylene group and 1-methyl-2-ethylpropylene group.

The term "$C_2$-$C_6$ acyl" means R"—C(=O) where R" is a $C_1$-$C_5$ alkyl group. In the cellulose mixed esters of the invention the acyl groups are connected via their carbonyl carbon atoms to oxygen atoms on anhydroglucose moieties of the cellulose.

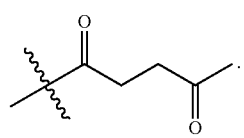 [SMILES: *C(=O)CCC(C)=O]

The term "levulinyl" means a radical of formula: In the cellulose mixed esters of the invention that comprise levulinyl ester groups, levulinyl groups are connected where shown ( ~~~~~ ) to oxygen atoms on anhydroglucose moieties of the cellulose.

The term "carboxy" means a radical of formula:

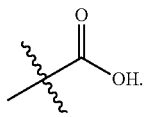

In the cellulose mixed esters of the invention that comprise carboxy groups, the carboxy groups may be connected where shown ( ~~~~~ ) to an alkylene moiety to form groups such as alkcarboxy:

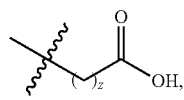

for example,

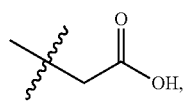

wherein z is a $C_{1-11}$alkylene and wherein alkylene is defined as above and ( ~~~~~ ) is the point of attachment.

Any alkyl group may optionally be substituted with one or more substituents selected from the group consisting of moieties not labile to the esterification process such as, but not limited to, halogen, cycloalkyl groups, aryl groups, straight or branched chain alkenyl groups, straight or branched chain alkynyl groups, each of which may optionally be substituted with one or more halogen atoms.

The term "halogen" means fluorine, chlorine, iodine or bromine.

ABBREVIATIONS

Figure 1:
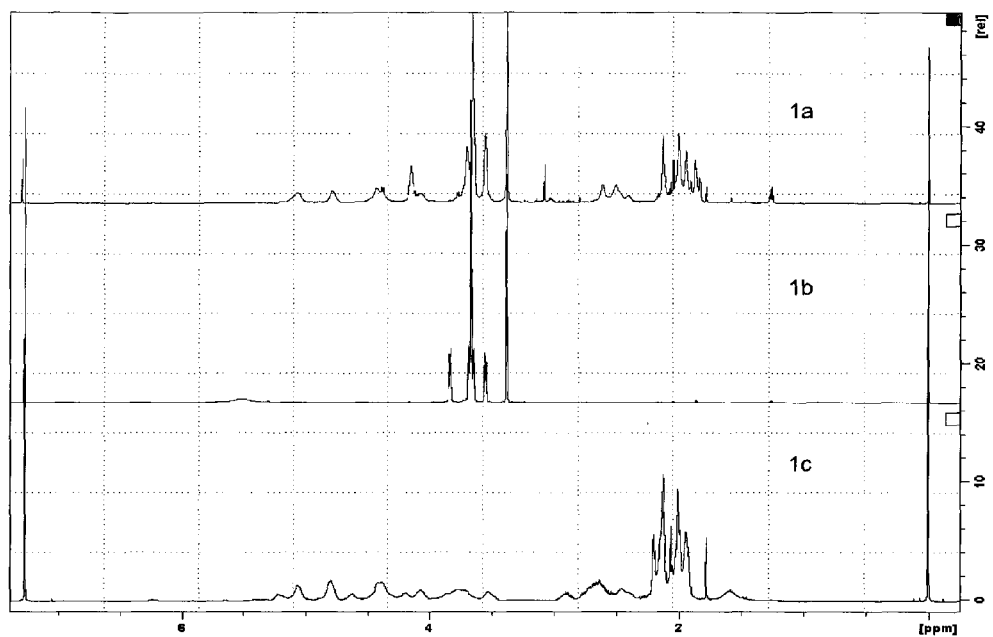
FIG. 1 shows the $^1$H NMR spectra of LAC-1 (1c), oxime 3b (1b) and LAC-3b-2 (1a).
Figure 2:
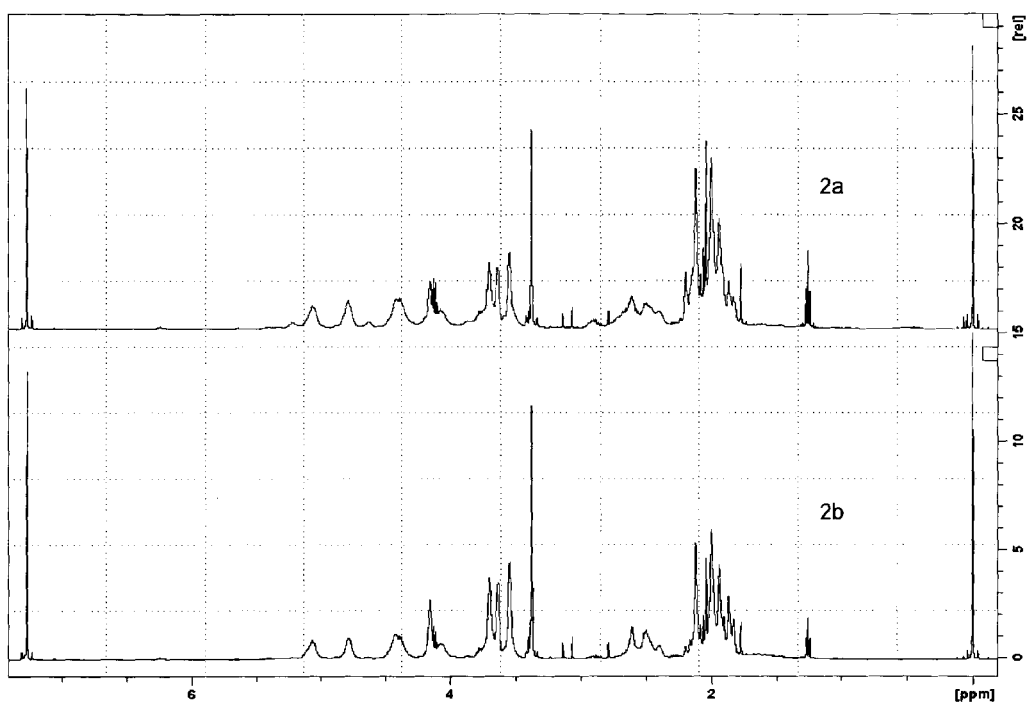
FIG. 2 shows the $^1$H NMR spectra of LAC-3a-1 (2a) and LAC-3a-2 (2b).
Figure 3:
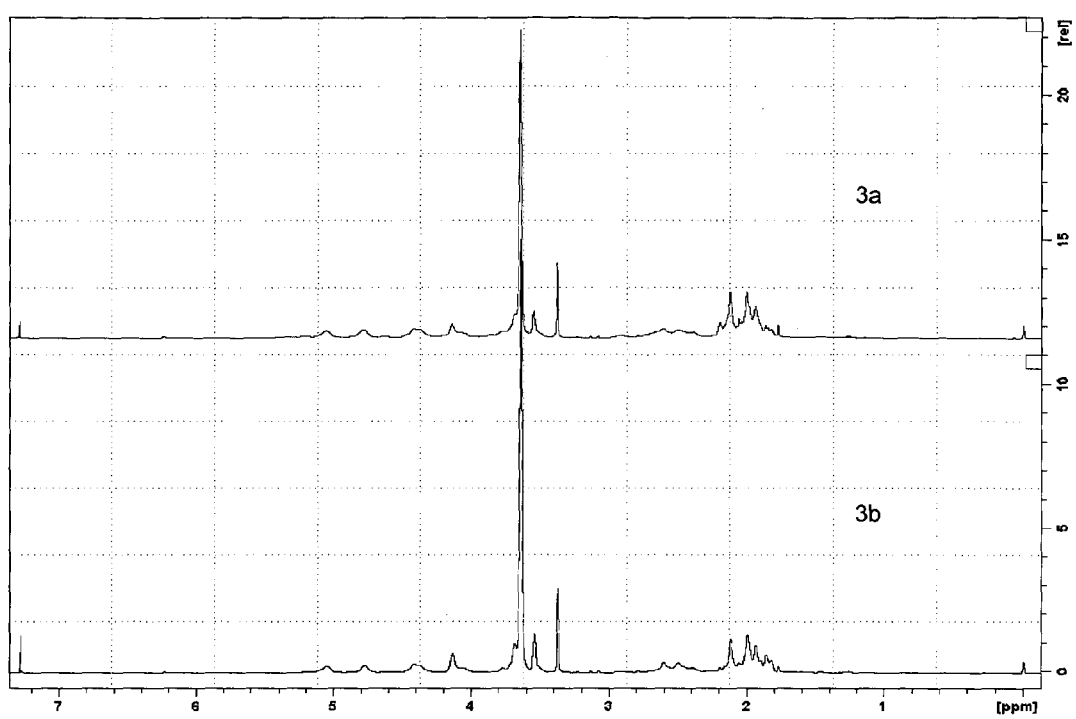
FIG. 3 shows the $^1$H NMR spectra of LAC-3c-1 (3a) and LAC-3c-2 (3b).
Figure 4:
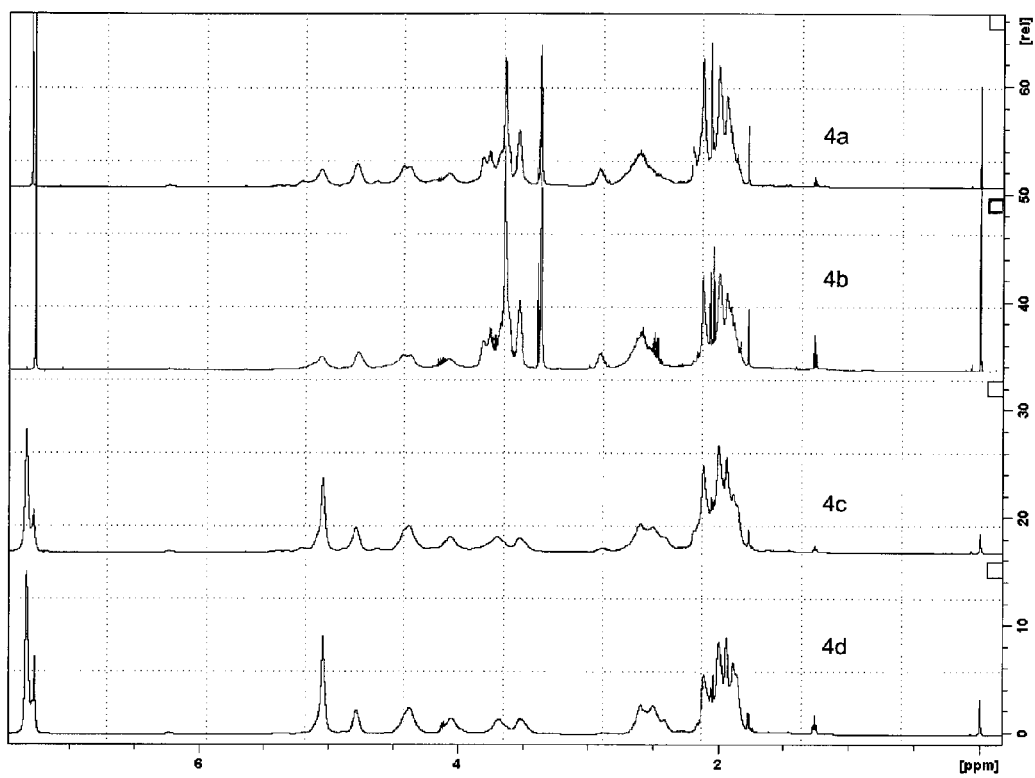
FIG. 4 shows the $^1$H NMR spectra of LAC-3f-1 (4c), LAC-3f-2 (4d), LAC-5-1 (4a) and LAC-5-2 (4b).
Figure 5:
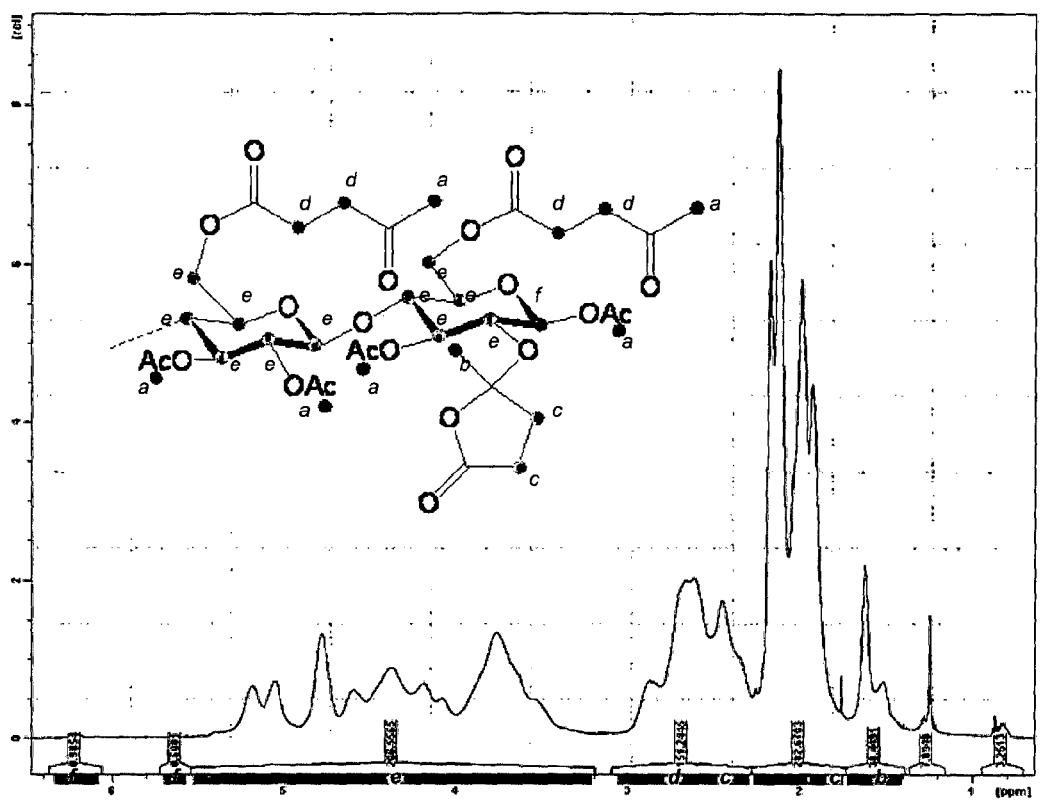
FIG. 5 shows the $^1$H NMR spectrum (CDCl$_3$) for a cellulose-acetyl-levulinyl-lactone mixed ester, the reaction product of pre-swelled cellulose with levulinic acid, acetic anhydride, sulfuric acid and 1,2-dichloroethane for a minimum reaction time to effect dissolution, showing the presence of species (7). The substitution pattern is non-exact but representative of the overall composition and relevant $^1$H NMR spectrum.

AcOH acetic acid
AGU anhydroglucose unit
BP boiling point.
CAB cellulose acetate butyrate
CDCl$_3$ deuterochloroform
$D_{Ac}$ degree of acyl substitution
$D_{Lev}$ degree of levulinyl substitution
$D_p$ degree of polymerisation
$D_s$ degree of substitution
D-rot total degree of substitution
DCE 1,2-dichloroethane
DCM methylene chloride
DSC differential scanning calorimetry
DMA dimethylacetamide
DMSO dimethylsulfoxide
ESI electrospray ionisation
FTIR Fourier transform infrared
HPLC high performance liquid chromatography
LevOH or Lev levulinic acid
MS mass spectrometry
Mn number average molecular weight
Mw mass average molecular weight
NMP n-methylpyrrolidine
NMR nuclear magnetic resonance
RI refractive index
OTf Triflate
SEC-MALLS size exclusion chromatography-multi angle laser light scattering
Tg glass transition temperature
TLC thin layer chromatography
TMS tetramethylsilane
UV/Vis ultraviolet/visible
VOC volatile organic compound

EXAMPLES

The following examples further illustrate the invention. It is to be appreciated that the invention is not limited to the examples.

General Procedures

NMR spectra are collected for $^1$H and $^{13}$C at 500 and 125 MHz respectively and are in CDCl$_3$ unless otherwise stated. Chemical shifts are in ppm from TMS. Degree of substitution ($D_s$) and degree of levulinyl substitution ($D_{lev}$) are calculated from $^1$H NMR integrals. Glass transition temperatures ($T_g$) are measured by differential scanning calorimetry (DSC). Samples are prepared by compressing 2-20 mg of material into a 40 µL pierced aluminium pan and are scanned between −40° and +180° C. at either 10° C./min or 5° C./min. The samples are heated and cooled three times and $T_g$ data are obtained from the second and third sweep; ignoring the initial annealing and de-solvating sweep. $T_g$ are determined by observation of the rate of change of slope and baseline shift for the glass and plastic states. Molecular weight is determined by comparison of retention times to polystyrene standards using high performance size exclusion chromatography (HPLC-SEC) coupled with a Dawn EOS multi-angle laser light scattering (SEC-MALLS) by Wyatt Technology to confirm molecular weights of samples. Chromatography is completed on a Waters Alliance 2690 HPLC coupled to a Waters 2410 Refractive Index (RI) detector and Waters 490E multi wavelength Ultraviolet Visible spectrometer (UV/Vis). A series of polystyrene standards (Tosoh Corporation, Cat 06476) are injected and the retention volume plotted against the published Mw values. The plot of retention volume versus log Mw can be approximated by a third order polynomial of R-squared value better than 0.998. Comparison of the retention volume for the peak maxima for the cellulose ester derivatives permits calculation of the molecular weight in comparison to polystyrene standards. The cellulose mixed ester (~10 mg) is dissolved in dimethylacetamide (1 mL) and clarified by centrifugation. An aliquot (10 µL) is injected onto a column system comprising the following Tosoh Corporation columns: Guard column (Super H-H, Cat 18003, 50×4.6 mm) in series with TSK-Gel Super HM-H and HM-L columns (150×6 mm, Cat 18001 and 17998). The system operated with flow rate 0.25 mL min$^{-1}$ and temperature 60° C. in dimethylacetamide (DMA). Peaks are detected with a refractive index monitor.

To support Mw calculations cellulose mixed esters are also treated with base to hydrolyse the ester groups and the residual cellulose oligomer mixture analysed directly by SEC-MALLS. Cellulose ester (approx 60 mg) is dissolved in dioxane (4 mL) and methanolic NaOMe (5M, 1 mL) at 50° C. After 15 min water (8 mL) is added and the suspension is heated at 50° C. for a further 15 min. The cooled suspension is centrifuged and the pellet washed with water and dried. A portion of this material (10 mg) was dissolved in dimethylacetamide-LiCl, (8% w/v, 1 mL) and clarified by centrifugation. Analysis, on the column system described above, operating with a mobile phase of 0.5% w/v LiCl/DMA was completed. Data for molecular weight determination are analysed using ASTRA software (Version 4.73.04) using a do/dc of 0.104 mL g$^{-1}$ (Refractive Index Data-book for Polymer and Biomolecular Scientists, A. Theisn, C. Johann, M. P. Deacon and S. E. Harding, Nottingham University Press, (1999) ISBN 1-897676-29-8reference).

Example 1

Preparation of a Levulinyl-acetyl Ester of Cellulose (LAC-1)

Example 1.1

Wood pulp (pinus, bleached, medium coarse, 16 g) is soaked in warm water (200 mL) and then filtered. The resulting damp, swelled cellulose is soaked in acetic acid (200 mL) at 40° for 90 min. Excess acid is removed by filtration and the cellulose is again soaked in acetic acid and filtered. Levulinic acid (97 g) and acetic anhydride (84 ml) are mixed and sulfuric acid (0.11 ml) is added. This mixture is added to the cellulose and the whole heated at 120° C. for 6 h. A mixture of NaHCO$_3$ solution (10 mL, 10% aqueous) and acetic acid (10 mL) is added to the reaction mixture and then the whole is poured slowly into water (4 L) with stirring. The precipitate is isolated by filtration. This material is dissolved in acetone (550 mL) and re-precipitated in water (3 L). The resulting light brown solid is isolated by filtration. Residual solvents are removed at 45° C. and 15 mm Hg to give LAC-1 (29 g). (D$_s$ 3.1 esters per anhydroglucose unit (AGU), D$_{lev}$ 0.82. T$_g$ 97° C. $^1$H NMR spectrum is shown in FIG. 1. M$_w$ 11800, DP 35.

Example 1.2

Preparation of a Levulinyl-Acetyl Ester of Cellulose at the 500 g Scale

Wood pulp (pinus, bleached, medium coarse, 500 g) is twice pre-soaked in water and then twice in acetic acid to give a wet cake comprising acetic acid (1.15 kg) and cellulose (0.5 kg). Levulinic acid (4.49 kg) is charged to a jacketed glass reaction vessel heated to 35° C. Sulfuric acid (3.5 mL) is charged to the vessel followed by the slow addition of acetic anhydride (2.835 kg) to ensure the exotherm does not raise the temperature above 60° C. The cellulose wet cake is charged to the reaction vessel and the jacket heated to 120° C. The reaction heating is continued with stirring for 4.8 hours and then the reaction is cooled to 30° C. over the period of 35 minutes. A solution of Mg(OAc)$_2$ (0.25 kg) and acetic acid (3.13 kg) with water (3.15 L) is prepared and charged to the reaction mixture with stirring for 15 hr. The reaction mixture is split into two approximately equal portions and each precipitated with water (37.5 L). The precipitates are recombined by sequential recovery on a polypropylene filter membrane (54 micron) in a filter drier. The filtrate is washed three times with water (15, 15 and 20 kg). The material is recovered and dried in a vacuum oven to recover the crude cellulose mixed ester (890.71 g). A portion (287.3 g) is further purified by dissolution in acetone (1 L) and precipitated into water (25 L). The precipitate was recovered on a filter paper (Advantec 2), slurried with water (12.5 L) and stirred (1.5 hr) before filtration and the filtrate plug-washed with water (3.5 L). The resulting light brown filtrate is dried and residual solvent removed at 45° C. and 15 mm Hg (48 hr) to give the final product (253.3 g). (D$_s$ 3.15 esters per anhydroglucose unit (AGU), D$_{lev}$ 1.22. T$_g$ 103.4° C. M$_w$ 9970, DP 27.

Example 1.3

Pre-swelled wood pulp (29.3% w/w cellulose with acetic acid) is washed with levulinic acid to generate a levulinic acid swelled cellulose (31.2% w/w cellulose with levulinic acid).

A reaction mixture is prepared that contains acetic anhydride (3 eq per OH, 5.67 g, 55.5 mmol), LevOH (1.33 eq to Ac$_2$O, 8.6 g) and sulfuric acid (conc, 7.15 uL). To this solution is charged the pre-swelled cellulose (1 g cellulose, 3.21 g levulinic-wet cellulose). The reaction mixture is heated to 120° C. for 2 hr. The reaction is cooled, diluted with dope solution (15 mL, 1:1 AcOH to water containing 10% w/w Mg(OAc)$_2$) and stirred. The clear solution is poured into rapidly mixed water (300 mL) and the resultant pale yellow precipitate is filtered (Advantec 1). Two repeat washings with water (150 mL) generate the final product that was dried overnight at 50° C.: By $^1$H NMR D$_{Tot}$ 3.05, D$_{Lev}$ 1.20, D$_{Ac}$ 1.85. T$_g$ 108° C.

Example 1.4

Preparation of a Levulinyl-Acetyl Ester of Cellulose Using Microwave Energy

Cellulose 1.64 g (0.25 g, 1.5 mmol AGU, 4.5 mmol OH; dry weight pre-swelled in acetic acid) was mixed with acetic anhydride (1.31 g, 12.8 mmol), levulinic acid (1.96 g, 16.9 mmol) and sulfuric acid (2 uL). The reaction mixture was treated to microwave energy for 10 minutes using 60 W with a maximum reaction temperature set to 130° C. After this period the clear brown solution was diluted (2 mL, 1:1 AcOH to water containing 10% w/w Mg(OAc)$_2$) poured into ~45 mL of water with vigorous stirring and the resultant precipitate was collected by centrifugation. The precipitate was washed twice with water and oven dried overnight (50° C.) to give an off-white solid LAC: By $^1$H NMR D$_{Tot}$ 3.5, D$_{Lev}$ 0.7, D$_{Ac}$ 2.8, T$_g$ 103° C., Mw 7600.

Example 2

Preparation of a Levulinyl-Propionyl Ester of Cellulose

The reaction is carried out in a similar fashion to Example 1.2 above except the reaction mixture contains propionic anhydride (3 eq per OH, 7.23 g, 55.5 mmol) instead of acetic anhydride and sulfuric acid (conc, 8.85 uL). An identical reaction and workup procedure is used, except the dope solution is poured into 600 mL of water to deliver the product: By $^1$H NMR $D_{Tot}$ 3.07, $D_{Lev}$ 1.84, $D_{Prop}$ 1.23. $T_g$ 76° C.

Example 3

Preparation of a Levulinyl-Isobutyryl Ester of Cellulose

The reaction is carried out in a similar fashion to Example 1.2 above except the reaction mixture contains isobutyric anhydride (3 eq per OH, 8.79 g, 55.5 mmol) instead of acetic anhydride and sulfuric acid (conc, 9.2 uL). An identical reaction and workup procedure is used, except the dope solution is poured into 1200 mL of water to deliver the product: By $^1$H NMR $D_{Tot}$ 3.04, $D_{Lev}$ 2.45, $D_{IsoBut}$ 0.59. $T_g$ 62° C.

Example 4

Preparation of a Levulinyl-Butyryl Ester of Cellulose

The reaction is carried out in a similar fashion to Example 1.2 above except the reaction mixture contains butyric anhydride (3 eq per OH, 8.79 g, 55.5 mmol) instead of acetic anhydride and sulfuric acid (conc, 8.95 uL). An identical reaction and workup procedure is used, except the dope solution is poured into 1200 mL of water to deliver the product: By NMR $D_{Tot}$ 2.93, $D_{Lev}$ 1.80, $D_{But}$ 1.13. $T_g$ 61° C.

Example 4a

Preparation of a Levulinyl-Butyl-Acetyl Ester of Cellulose

In a similar fashion to example 1.3 a reaction mixture was prepared excepting that the acetic acid pre-swelled cellulose was treated with butyric anhydride (3 eq) and the catalyst sulfuric acid was replaced with aluminium triflate (Al(OTf)$_3$, 0.08 mol % compared to hydroxyl). The reaction was permitted to proceed for 30 minutes at 120° C. and worked up in a similar fashion to produce BLAC as an off-white solid: By NMR $D_{Tot}$ 3.3, $D_{Lev}$ 1.9, $D_{Bu}$ 1.1, $D_{Ac}$ 0.3, Tg 63° C., MW 12,000.

Example 4b

Preparation of a Levulinyl-Butyl-Acetyl Ester of Cellulose

In a similar fashion to example 4a, a reaction mixture was prepared excepting that the catalyst was aluminium triflate (Al(OTf)$_3$, 3.3 mol % compared to hydroxyl, 10 mol % compared to AGU). The reaction was permitted to proceed for 15 minutes at 83° C. and worked up in a similar fashion to produce BLAC as a white solid: By NMR $D_{Tot}$ 3.2, $D_{Lev}$ 1.6, $D_{Bu}$ 0.5, $D_{Ac}$ 1.1, Tg 103° C., MW 26,000.

Example 4c

Preparation of a Levulinyl-Butyl-Acetyl Ester of Cellulose

In a similar fashion to example 4a, a reaction mixture was prepared excepting that the catalyst was ytterbium triflate (Yb(OTf)$_3$ and H$_3$PO$_4$, both at 0.8 mol % compared to hydroxyl, 10 mol % compared to AGU). The reaction was permitted to proceed for 60 minutes at 83° C. and worked up in a similar fashion to produce BLAC as a white solid: By NMR $D_{Tot}$ 2.9, $D_{Lev}$ 1.9, $D_{Bu}$ 0.8, $D_{Ac}$ 0.1, Tg 80° C., MW 17,000.

Example 5

Preparation of a Levulinyl-Valeryl Ester of Cellulose

The reaction is carried out in a similar fashion to Example 1.2 above except the reaction mixture contains valeric anhydride (3 eq per OH, 10.35 g, 55.5 mmol) instead of acetic anhydride and sulfuric acid (conc, 9.9 uL). An identical reaction and workup procedure is used, except the dope solution is poured into 500 mL of water, generating an oiled-out product. The water is decanted and the sticky material triturated with water (500 mL, 40° C.). The polymer begins to harden with this treatment and an additional 500 mL trituration at room temperature with vigorous stirring for 16 hr is completed. Re-precipitation from acetone (~35 mL acetone poured into 450 mL of water) delivers the product the product after overnight drying at 50° C.: By NMR $D_{Tot}$ 3.13, $D_{Lev}$ 2.03, $D_{val}$ 1.1. $T_g$ 45° C.

Example 6

Preparation of a Levulinyl-Hexanoyl Ester of Cellulose

The reaction is carried out in a similar fashion to Example 1.2 above except the reaction mixture contains hexanoic anhydride (3 eq per OH, 11.9 g, 55.5 mmol) instead of acetic anhydride and sulfuric acid (conc, 10.8 uL). An identical reaction and workup procedure is used, except the dope solution is poured into 500 mL of water generating soft amorphous solid. The water is decanted and the sticky material triturated with water (500 mL, 40° C.). The polymer is dispersed into a 45° C. 1:1 mixture of methanol and isopropanol and upon cooling to 0° C. the polymer is recovered from the solution with filtration. Re-precipitation from acetone (~35 mL acetone poured into 16.6% aqueous AcOH (400 mL)). The solid is re-washed with 16.6% aqueous AcOH (200 mL), 8.3% aqueous AcOH (200 mL) and finally water (200 mL). The product is dried overnight at 50° C.: By NMR $D_{Tot}$ 2.95, $D_{Lev}$ 2.04, $D_{Hex}$ 0.91. $T_g$ 54° C.

Example 7

Alternative Methods for the Preparation of a Levulinyl-Acetyl Ester of Cellulose (Co-Solvent Reaction Processes)

Example 7.1

Pre-swelled cellulose (5 g cellulose, 16.1 g AcOH-wet cellulose) is stirred and heated to reflux with acetic anhydride (45 g), LevOH (65 g), sulfuric acid (conc, 100 uL) and dichloromethane (DCM, 60 mL). After 16 hr the reaction is halted, the chlorinated solvent evaporated and the reaction diluted with 10% aqueous Mg(OAc)$_2$ solution (10 mL) before pouring into a stirred 20% ethanol/water solution (100 mL). The solid formed is recovered by filtration and twice washed with ethanol before drying overnight at 50° C.:

By NMR $D_{Tot}$ 2.9, $D_{Lev}$ 0.9, $D_{Lactone}$ 0.86. $T_g$ 137° C. NMR (CDCl$_3$) refer FIG. 6; δ $^1$H ppm 1.55 brds C$\underline{H}_3$-lactone, 1.65 brds C$\underline{H}_3$-lactone, 1.80-2.25 multiple brds, CH$_3$—C═O, 2.30-3.00 brdm Lev C$\underline{H}_2$C$\underline{H}_2$, 3.20-5.40 m cellulose C$\underline{H}$, 6.20 reducing end anomeric C$\underline{H}$; δ$^{13}$C ppm (all broad multiplets) 20.7 Ac, 20.8 Ac, 23.1 lactone CH$_3$, 25.1 lactone CH$_3$, 27.8 Lev CH$_2$, 28.9 lactone CH$_2$, 29.7 Lev CH$_3$, 34.5 lactone CH$_2$, 37.6 Lev CH$_2$, 60.5 cell-CH$_2$, 62.3 cell-CH$_2$, 72-77 cell-CH, 100.1, anomeric CH, 109.4 lactone C, 169-172 ester, 175.7 lactone, 206.2 Lev C═O.

Example 7.2

A reaction mixture is prepared that contains acetic anhydride (28 g), LevOH (40 g), sulfuric acid (conc, 62 uL) and 1,2-dichloroethane (DCE, 53 g). Pre-swelled cellulose (1.24 g cellulose, 4 g AcOH-wet cellulose) is reacted with 40.6 g of the reaction mixture solution. The reaction mixture is heated with stirring to reflux and after 60 minutes the clear orange solution is cooled. Evaporation of the chlorinated solvent and dilution with 30 mL of an acidified aqueous solution containing Mg(OAc)$_2$ then pouring into a 20% ethanol in water (60 mL) solution permits the recovery of a pale yellow product by filtration. Washing twice with 20% ethanol in water and filtration followed by overnight drying at 50° C. gives an off-white solid (1.70 g): By NMR $D_{Tot}$ 3.3, $D_{Lev}$ 1.15, $D_{Lactone}$ 0.43. $T_g$ 114° C.

Example 7.3

A reaction mixture is prepared that contains acetic anhydride (567 g, 5.55 mol, 3 eq per OH), LevOH (810 g, 6.97 mol), sulfuric acid (conc, 126 uL) and 1,2-dichloroethane (DCE, 729 g). To this solution is charged pre-swelled cellulose (100 g cellulose, 326 g AcOH-wet cellulose). The reaction mixture is heated without stirring to reflux and after 5 hours the solution is cooled. Evaporation of the chlorinated solvent and dilution with 3.79 kg of an acidified aqueous solution containing Mg(OAc)$_2$ then pouring into a 20% ethanol in water solution (5 L) permits the recovery of a pale yellow product by filtration. Washing twice with 20% ethanol in water and filtration followed by overnight drying at 50° C. gives an off-white solid (154.3 g, 69%): By NMR $D_{Tot}$ 3.06, $D_{Lev}$ 1.30, $D_{Lactone}$<0.2, $T_g$ 87° C.

Example 8

Preparation of Alkoxyamines (3)

Scheme 1

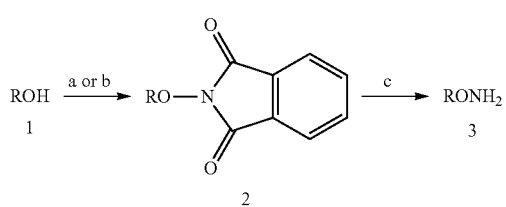

a R = CH$_3$(OCH$_2$CH$_2$)$_2$
b R = CH$_3$(OCH$_2$CH$_2$)$_3$
c R = CH$_3$(OCH$_2$CH$_2$)$_{6-11}$
d R = n-C$_8$H$_{17}$
f R = benzyl
Reagents: a) MsCl, Et$_3$N, CH$_2$Cl$_2$; then N-hydroxyphthalimide, diisopropylethylamine, DMF, 90° C. b) N-hydroxyphthalimide, diisopropylazodicarboxylate, Ph$_3$P, THF; c) hydrazine hydrate, MeOH or EtOH.

Step 1—Preparation of Alkoxyphthalimides 2

A solution of a monomethyl ethylene glycol 1a-d (16-60 mmol) in CH$_2$Cl$_2$ (dry, 10-120 mL) with methansulfonic chloride (1.1 eq) is cooled in an ice-water bath whilst Et$_3$N (1.6 eq) is added slowly. On completion of the addition the mixture is stirred at room temperature for 1 h. Salts are removed by filtration and the filtrate concentrated to dryness. The residue is taken up in EtOAc and extracted twice with water. The EtOAc solution is dried and concentrated. The resulting mesylate, N-hydroxyphthalimide (1.1 eq) and diisopropylethylamine (1.05 eq) are dissolved in DMF (50-100 mL) and heated at 90° C. for 6 h. After cooling the solvent is evaporated and the residue partitioned between EtOAc and Na$_2$CO$_3$ (10% aqueous). The EtOAc solution is washed with further Na$_2$CO$_3$ solution and with water; dried, and concentrated to give the alkoxyphthalimides 2.

2-(2-(2-Methoxyethoxy)ethoxy)isoindoline-1,3-dione 2a

Diethylene glycol monomethyl ether 1a (2 g, 16.7 mmol) gives alkoxyphthalimide 2a (3.6 g, 82%) as a brownish oil. $^1$H NMR δ 7.84 (m, 2H), 7.75 (m, 2H), 4.39 (m, 2H), 3.88 (m, 2H), 3.67 (m, 4H), 3.48 (m, 2H), 3.29 (s, 3H). $^{13}$C NMR δ 163.3, 134.4, 129.0, 123.5 (all 2C), 77.2, 71.8, 70.7, 69.4, 58.9. ESI-MS calc. for C$_{13}$H$_{15}$NO$_5$Na [M+Na]$^+$ 288.0848. found 288.0846.

2-(2-(2-(2-Methoxyethoxy)ethoxy)ethoxy)isoindoline-1,3-dione 2b

Triethylene glycol monomethylether 2a (5.2 g, 31.7 mmol) gives alkoxyphthalimide 2b (7.4 g, 75%) as a pale brown waxy solid. Mp (EtOAc-hexanes) 40-41°. $^1$H NMR δ 7.85 (m, 2H), 7.76 (m, 2H), 4.38 (m, 2H), 3.87 (m, 2H), 3.67 (m, 2H), 3.58 (m, 4H), 3.50 (m, 2H), 3.35 (s, 3H). $^{13}$C NMR δ 163.4, 134.4, 129.0, 123.4 (2C each), 77.2, 71.8, 70.8, 70.5, 70.5, 69.2, 59.0. ESI-MS calc. for C$_{15}$H$_{19}$NO$_6$Na [M+Na]$^+$ 332.110. found 332.1119.

Methoxypolyethoxyisoindoline-1,3-dione 2c

Polyethylene glycol monomethyl ether, MW 350 1c (20 g, 58.8 mmol) gives alkoxy-phthalimide 2c (18.9 g, 66%). $^1$H NMR δ 7.84 (m, 2H), 7.75 (m, 2H), 4.38 (m, 2H), 3.69-3.52 (bm, poly H), 3.34 (s, 3H). 13C NMR δ 163.2, 134.3, 128.8, 123.3 (all 2C), 77.0, 71.8, 70.6, 70.4 (poly C), 69.2, 58.8. MS calc. for C$_{21}$H$_{31}$NO$_9$Na [M+Na]$^+$ 464.1897. found 464.1892; calc. for C$_{23}$H$_{35}$NO$_{10}$Na [M+Na]$^+$ 508.2159. found 508.2154; calc. for C$_{25}$H$_{39}$NO$_{11}$Na [M+Na]$^+$ 552.2421. found 552.2418; calc. for C$_{27}$H$_{43}$NO$_{12}$Na [M+Na]$^+$ 596.2683. found 596.2682.

2-(Octyloxy)isoindoline-1,3-dione 2d n-Octanol 1d (1 g, 7.7 mmol) gave alkoxyphthalimide (1.0 g, 47%) as white plates, mp 51-52°. $^1$H NMR δ 7.84 (m, 2H), 7.74 (m, 2H), 4.20 (t, J=6.8 Hz, 2H), 1.79 (m, 2H), 1.48 (m, 2H), 1.39-1.25 (bm, 8H), 0.88 (t, J=6.9 Hz, 3H). $^{13}$C NMR δ 163.7, 134.5, 129.1, 123.6 (2C each), 78.7, 31.9, 29.4, 29.3, 28.3, 25.6, 22.7, 14.2. ESI-MS calc. for C$_{16}$H$_{21}$NO$_3$Na [M+Na]$^+$298.1419. found 298.1423.

Step 2—Preparation of Alkoxyamines 3

A solution of phthalimide 2a-d (3.8-16 mmol) in methanol or ethanol (10-50 mL) is cooled in an ice-water bath whilst hydrazine hydrate (51%, 1.3 eq) is added. The solution is then stirred at room temperature for 1 h, filtered and concentrated under reduced pressure. The residue is dissolved in water (20-30 mL) and extracted twice with EtOAc (10 mL). The aqueous phase is concentrated to give the title oxyamines 3a-c as pale yellow oils.

O-(2-(2-Methoxyethoxy)ethyl) hydroxylamine 3a

Hydroxyphthalimide 2a (1 g, 3.8 mmol) gave hydroxylamine 3a (0.30 g, 59%). $^1$H NMR δ 5.37 (bs, 2H), 3.84 (m, 2H), 3.67 (m, 4H), 3.56 (m, 2H), 3.38 (s, 3H). $^{13}$C NMR δ 74.7, 71.9, 70.4, 69.5, 58.9. ESI-MS Calc for $C_5H_{14}NO_3$ [M+H]$^+$ 136.0974. found 136.0973.

O-(2-(2-(2-Methoxyethoxy)ethoxy)ethyl)hydroxylamine 3b

Hydroxyphthalimide 2b (5.0 g, 16.3 mmol) gives hydroxylamine 3b (1.4 g, 48%). $^1$H NMR δ 5.49 (bs, 2H), 3.84 (m, 2H), 3.67 (m, 2H), 3.56 (m, 2H), 3.38 (s, 3H). $^{13}$C NMR δ 74.8, 72.0, 70.6, 70.5 (2C), 69.6, 59.0. ESI-MS calc. for $C_7H_{18}NO_4$[M+H]$^+$ 180.1236. found 180.1239.

Methoxypolyethoxyethylhydroxylamine 3c

Hydroxyphthalimide 2c (3.0 g, 6.2 mmol) gives hydroxylamine 3c (1.1 g, 50%). $^1$H NMR δ 5.48 (bs, 2H), 3.83 (m, 2H), 3.74-3.62 (bm, poly H), 3.55 (m, 2H), 3.38 (s, 3H). $^{13}$C NMR δ 74.6, 71.8, 70.4, 69.4, 58.8. ESI-MS calc. for $C_{15}H_{34}NO_8$ [M+H]' 356.2285. found 356.2275; calc. for $C_{17}H_{38}NO_9$ [M+H]$^+$ 400.2547. found 400.2540; calc. for $C_{19}H_{42}NO_{10}$ [M+H]$^+$ 444.2809. found 444.2802; calc. for $C_{21}H_{46}NO_{11}$[M+H]$^+$ 488.3071. found 488.3069.

O-Octylhydroxylamine 3d

Hydroxyphthalimide 2d (0.45 g, 1.6 mmol) gave hydroxylamine 3d (0.19 g, 80%). $^1$H NMR δ 5.34 (bs, 2H), 3.65 (t, J=6.9 Hz, 2H), 1.57 (m, 2H), 1.35-1.23 (bm, 10H), 0.88 (t, J=6.8 Hz, 3H). $^{13}$C NMR δ 76.3, 31.8, 29.5, 29.3, 28.4, 26.0, 22.7, 14.1. ESI-MS calc. for $C_8H_{20}NO$ [M+H]$^+$ 146.1545. found 146.1528.

Example 9

Preparation of Acyl Hydrazides (5)

Ethyl 3-(2-(2-methoxyethoxy)ethoxy)propanoate 4

Sodium hydride (60%, 0.034 g, 0.02) is suspended in THF (10 mL) and diethylene glycol monomethyl ether (5.00 ml, 42.4 mmol) is added with ice cooling. Ethyl acrylate (4.71 ml, 1.02 eq) is added and the solution stirred at room temperature for 2 h. Acetic acid (0.049 ml, 0.849 mmol) is added and the solution concentrated. The residue is taken up in EtOAc (20 mL) and washed with water. The organic phase is dried and evaporated to give a clear liquid which is purified by distillation (120 C, 0.3 torr), 4, 5.2 g, 56%. $^1$H NMR δ 4.15 (q, J=7.4 Hz, 2H), 3.76 (t, J=6.5 Hz, 2H), 3.63 (m, 6H), 3.54 (m, 2H), 3.38 (m, 3H), 2.59 (t, J=6.5 Hz, 2H), 1.26 (t, J=7.2 Hz, 3H). $^{13}$C NMR δ 171.6, 72.0, 70.5 (2C), 70.4, 66.7, 60.4, 60.0, 35.1, 14.2. ESI-MS calc. for $C_{10}H_{20}O_5Na$ [M+Na]$^+$ 243.1208. found 243.1208.

3-(2-(2-methoxyethoxy)ethoxy)propionohydrazide 5

Hydrazine hydrate (51%, 0.35 mL, 3 eq) is added to a solution of ester 4 (0.42 g, 1.9 mmol) in ethanol (0.35 mL). After 16 h the solution is concentrated under reduced pressure to give the title hydrazide 5 (0.42 g, 107%). $^1$H NMR δ 7.80 (bs, 1H), 3.72 (t, J=5.7 Hz, 2H), 3.64 (m, 6H), 3.59 (m, 2H), 3.39 (m, 3H), 2.48 (t, J=5.7 Hz, 2H), 2.24 (bs, 2H). $^{13}$C NMR δ 172.1, 71.9, 70.5, 70.3, 70.2, 66.8, 59.0, 35.3. ESI-MS calc. for $C_8H_{19}N_2O_4$ [M+H]$^+$ 201.1345. found 201.1341.

Example 10

Preparation of Oxime and Acyl Hydrazide Derivatives of LAC-1

LAC-1 (0.2 g) is dissolved in CH$_3$Cl or EtOAc (2 mL). Alkoxyamine or acyl hydrazide 3a-d, 3f, 5 (0.43 or 0.23 mmol, 2.2 or 1.2 mmol/g LAC-1) and acetic acid (0.002 mL) are added and the solution stirred at room temperature until all the alkoxyamine or acyl hydrazide has reacted (2-10 h, TLC evidence). The solvents are evaporated to give the oximes or acyl hydrazide. The $^1$H NMR spectra show conclusive evidence for formation of the oximes. The resonance for the H-1 protons of the alkoxyamine (3.47-3.84 ppm) disappears and is replaced by a resonance at for the oxime (3.79-4.15 ppm). Levulinate methyl and methine resonance are shifted to lower field. A typical set of spectra is shown in FIG. 1 and further spectra are shown in FIGS. 2-5. Glass transition temperatures are listed in Table 4.

TABLE 4

Glass Transition Temperature ($T_g$) of Cellulose Mixed Esters[1]

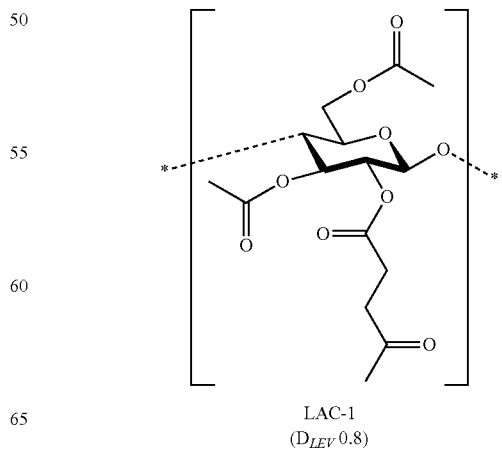

LAC-1
($D_{LEV}$ 0.8)

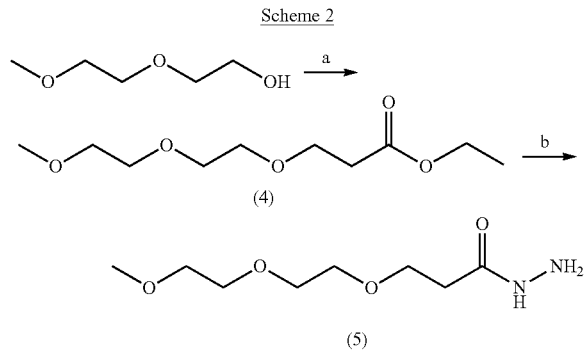

Reagents: a) Ethyl acrylate, NaH (cat), THF; b) Hydrazine hydrate.

TABLE 4-continued

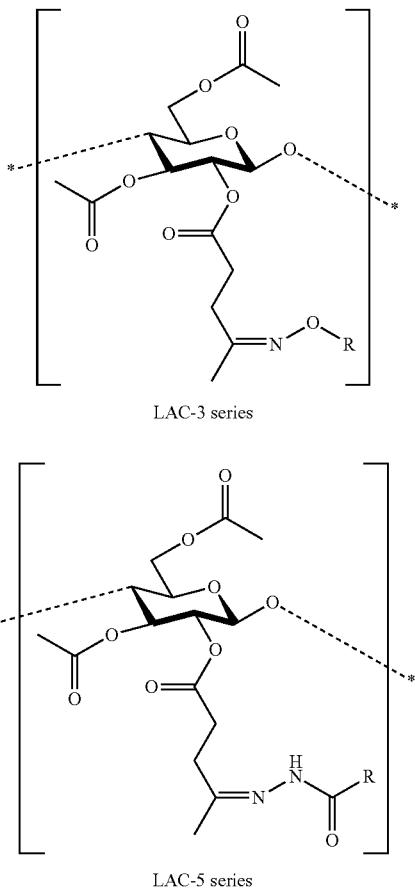

LAC-3 series

LAC-5 series

| Sample | Derivatizing Compound | $T_g$ (° C.) | R degree of incorporation (mmol/g LAC-1) | R |
|---|---|---|---|---|
| LAC-1 | None | 97 | None | None |
| LAC-3a-2 | 3a | 30 | 2.2 | $CH_3(OCH_2CH_2)_2$ |
| LAC-3a-1 | 3a | 40 | 1.2 | $CH_3(OCH_2CH_2)_2$ |
| LAC-3b-2 | 3b | 3 | 2.2 | $CH_3(OCH_2CH_2)_3$ |
| LAC-3c-2 | 3c | −20 | 2.2 | $CH_3(OCH_2CH_2)_{6-11}$ |
| LAC-3c-1 | 3c | 25 | 1.2 | $CH_3(OCH_2CH_2)_{6-11}$ |
| LAC-3d-1 | 3d | 70 | 1.2 | $CH_2(CH_2)_6CH_3$ |
| LAC-3f-1 | 3f | 65 | 1.2 | benzyl |
| LAC-3f-2 | 3f | 40 | 2.2 | benzyl |
| LAC-5-2 | 5 | 30 | 2.2 | $CH_3(OCH_2CH_2)_2$ |
| LAC-5-1 | 5 | 44 | 1.2 | $CH_3(OCH_2CH_2)_2$ |

[1]Number and positions of substituents on the cellulose backbone of the three structures shown above are representative only. The ester substituents are randomly substituted on the cellulose backbone.

Example 11

Solubility of Cellulose Mixed Esters

LAC-1 is soluble to at least 10% w/v in ethyl cellosolve, cyclohexanone, chloroform, dibasic ester, N-methylpyrrolidone, pyridine, dioxane and acetone.

TABLE 5

| Solubility of LAC-3b-2 | | |
|---|---|---|
| Soluble | Semisoluble | Insoluble |
| Dimethylformamide | Butyl Acetate | Amyl Alcohol |
| Methylene Chloride | | Water |
| Methanol | | Propylene n-butyl glycol ether |
| Dioxane | | Dipropylene n-butyl glycol ether |
| Methyl Ethyl Ketone | | Isopropanol |
| Acetone | | Toluene |
| Ethyl Cellosolve | | Ethanol |
| Chloroform | | Texanol |
| Dimethylsulfoxide | | |
| Dimethylacetamide | | |
| N-methyl 2-pyrrolidone | | |
| Acetic Acid | | |
| Acetic Anhydride | | |
| Diacetone Alcohol | | |
| Cyclohexanone | | |
| Di-Basic ester | | |
| Pyridine | | |
| Butyl Lactate | | |

Example 12

Solventborne Paint Formulations

| Gloss White | |
|---|---|
| | wt % |
| Soya Lecithin | 0.1 |
| LAC-3b-2 | 43.0 |
| Methyl dibasic ester* and cyclohexanone (50:50) | 34.5 |
| Titanium Dioxide | 22.0 |
| Bentonite Clay | 0.4 |
| TOTAL | 100.0 |

Pigment Volume Concentration (PVC) = 17%; Volume Solids (VS) = 47%
*Mixture of dimethyl adipate, dimethyl glutarate and dimethyl succinate (approximately 17:66:17% by mass).

| Satin White | |
|---|---|
| | wt % |
| Soya Lecithin | 0.5 |
| LAC-3b-2 | 28.0 |
| Methyl dibasic ester* and cyclohexanone (50:50) | 33.0 |
| Titanium Dioxide | 21.0 |
| Nepheline Syenite | 17.0 |
| Bentonite Clay | 0.5 |
| TOTAL | 100.0 |

Pigment Volume Concentration (PVC) = 39%; Volume Solids (VS) = 46%
*Mixture of dimethyl adipate, dimethyl glutarate and dimethyl succinate (approximately 17:66:17% by mass).

Example 13

Waterborne Paint Formulations

Example 13.1

A ~20% w/v Binder Emulsion of a Pegylated Oxime Derivative of LAC-1

LAC-3a-2 (1.84 g) is dissolved in ethyl acetate (2 mL) and triethylamine (20 µL) at ~60° C. The surfactants Maxemul 7107 (183 mg) and Maxemul 7203 (200 µL) are added and the solution vigorously agitated with an UltraTurrex blender for 2-3 minutes at ~60° C. To this solution is added water (4 mL) with continued agitation and heating at 80° C. The emulsion is applied to a Minimum Film Forming Temperature (MFFT) bar and the minimum temperature range that a film is observed to form is recorded at 15-19° C.

Example 13.2

A ~20% w/v Binder Emulsion of the Octyl Oxime Derivative of LAC-1

Octyl-3d-1 (1.15 g) is dissolved in ethyl acetate (2 mL) and triethylamine (20 µL) at ~60° C. The surfactants Maxemul 7107 (183 mg) and Maxemul 7203 (200 µL) are added and the solution vigorously agitated with an UltraTurrex blender for 2-3 minutes at ~60° C. To this solution is added water (3 mL) with continued agitation and heating at 80° C. The emulsion is applied to a Minimum Film Forming Temperature (MFFT) bar and the minimum temperature range that a film is observed to form is recorded at 33-37° C.

Example 13.3

A Zero VOC Polymer Dispersion

Butyl-levulinyl-acetyl cellulose (BLAC; $DS_{Tot}$ 2.89, $DS_{Lev}$ 0.35, $DS_{Bu}$ 2.20, $DS_{Ac}$ 0.34) was modified by the inclusion of (Carboxymethyl)hydroxylamine to from a $DS_{COOH}$ 0.19 carboxylic acid-imine linked BLAC of acid number 31.6. Dissolution in acetone neutralized with triethylamine and rapid precipitation into water using a T-mixer or equivalent high-shear rapid mixing method generated a stable polymer dispersion of particle size <500 nm. Evaporative distillation of the acetone to negligible levels (as determined by gas chromatography) generated a stable (>60 days without displaying settling or gelling) dispersion of up to 30% w/w polymer in water. The dispersion readily forms a film at room temperature (18-25° C.).

Example 13.4

Paint Formulation from a Zero VOC Polymer Dispersion

The material generated in example 13.3 was mixed with a generic gloss mill-base ["Architectural coatings" Chapter 38 in "Surface Coatings" Volume 2, (2002) Southwood Press, Australia] containing the usual ingredients; e.g. titanium dioxide, water, anionic dispersants and antimicrobial agents. Production of a film on an opacity card using a standard draw-down bar generated a flexible, continuous, opaque, uniform film. The film characteristics could readily be further modification of the formulation, for example by the inclusion of plasticizer, for example, sucrose acetate isobutyrate (SAIB) or equivalent and by the inclusion of cross linking agents, for example adipic acid dihydrazide Although the invention has been described by way of example, it should be appreciated the variations or modifications may be made without departing from the scope of the invention. Furthermore, when known equivalents exist to specific features, such equivalents are incorporated as if specifically referred to in the specification.

INDUSTRIAL APPLICABILITY

The present invention relates to cellulose-levulinyl mixed esters which are useful as starting materials for producing a variety of cellulose mixed ester derivatives. The invention further relates to cellulose mixed esters which are useful, for example, in coating compositions.

The invention claimed is:

1. A cellulose mixed ester wherein,
    a total degree of substitution per anhydroglucose unit is about 2.5 to about 3.5;
    a residual hydroxyl functionality per anhydroglucose unit is about 0 to about 0.5;
    a degree of substitution per anhydroglucose unit by $C_2$-$C_6$ ester groups is about 0.5 to about 2.8; and
    a degree of substitution per anhydroglucose unit by levulinyl ester groups is about 0.2 to about 2.6.

2. The cellulose mixed ester according to claim 1, wherein the total degree of substitution per anhydroglucose unit is about 2.5 to about 3.3.

3. The cellulose mixed ester according to claim 1, having an average molecular weight (Daltons) of about 800 to about 105,000.

4. The cellulose mixed ester according to claim 1, having a degree of polymerisation from about 2 to about 250.

5. The cellulose mixed ester according to claim 1, wherein the total degree of substitution per anhydroglucose unit is about 2.9 to about 3.2.

6. The cellulose mixed ester according to claim 1, wherein the degree of substitution per anhydroglucose unit by $C_2$-$C_6$ ester groups is about 0.5 to about 2.5.

7. The cellulose mixed ester according to claim 1, wherein the degree of substitution per anhydroglucose unit by levulinyl ester groups is about 0.75 to about 1.9 and the degree of substitution per anhydroglucose unit by $C_2$-$C_6$ ester groups is about 1.1 to about 2.25.

8. A cellulose mixed ester having:
    a total degree of substitution per anhydroglucose unit of about 2.9 to about 3.3;
    a residual hydroxyl functionality per anhydroglucose unit of 0 to about 0.5;
    a degree of substitution per anhydroglucose unit by $C_2$-$C_6$ alkyl ester groups of about 0.5 to about 2.8;
    a degree of substitution per anhydroglucose unit by $R^1$ ester groups of about 0.2 to about 2.6;
    where $R^1$ is a radical of formula (i):

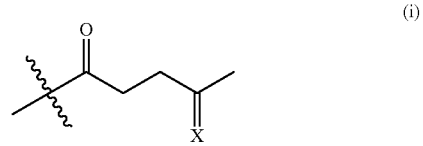

where each X in the cellulose mixed ester is independently selected from the group consisting of: O, N—O—$R^2$ and N—NH—C(=O)—$R^3$, where
$R^2$ is $CH_3(OCH_2CH_2)_2$, $CH_3(OCH_2CH_2)_3$, $CH_3(OCH_2CH_2)_{6-11}$ or benzyl, alkyl or alkylcarboxy; and
$R^3$ is $CH_3(OCH_2CH_2)_2$, $CH_3(OCH_2CH_2)_3$, $CH_3(OCH_2CH_2)_{6-11}$;
provided that not all X groups in the cellulose mixed ester are O.

9. A cellulose mixed ester of formula (I):

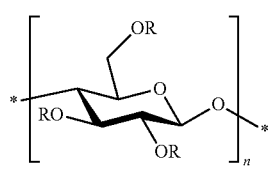

(I)

where:
n is an integer from 2 to 250; and
each R in the cellulose mixed ester is independently selected from the group consisting of H, $C_2$-$C_6$ acyl and levulinyl;
provided that not all R groups are H, and provided that not all R groups are $C_2$-$C_6$ acyl, and provided that not all R groups are selected from H and $C_2$-$C_6$ acyl, wherein the cellulose mixed ester has a total degree of substitution per anhydroglucose unit of about 2.5 to about 3.3, a residual hydroxyl functionality per anhydroglucose unit of 0 to about 0.4, a degree of substitution per anhydroglucose unit by $C_2$-$C_6$ alkyl ester groups of about 0.5 to about 2.8, and a degree of substitution per anhydroglucose unit by levulinyl ester groups of about 0.2 to about 2.6.

10. A cellulose mixed ester of formula (II):

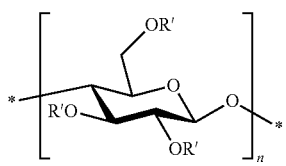

(II)

wherein:
n is an integer from 2 to 250; and
each R' in the cellulose mixed ester is independently selected from the group consisting of H, $C_2$-$C_6$ acyl and $R^1$;
wherein:
$R^1$ is a radical of formula (i)

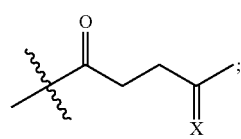

(i)

where each X in the cellulose mixed ester is independently selected from the group consisting of: O, N—O—$R^2$ and N—NH—C(=O)—$R^3$; each $R^2$ in the cellulose mixed ester is independently selected from the group consisting of $CH_3(OCH_2CH_2)_2$, $CH_3(OCH_2CH_2)_3$, $CH_3(OCH_2CH_2)_{6-11}$, alkyl, alkylcarboxy and benzyl; and each $R^3$ in the cellulose mixed ester is independently selected from the group consisting of $CH_3(OCH_2CH_2)_2$, $CH_3(OCH_2CH_2)_3$ and $CH_3(OCH_2CH_2)_{6-11}$;
provided that not all R' groups are H, and provided that not all R' groups are $C_2$-$C_6$ acyl, and provided that not all R' groups are selected from H and $C_2$-$C_6$ acyl, wherein the cellulose mixed ester has a total degree of substitution per anhydroglucose unit of about 2.5 to about 3.3, a residual hydroxyl functionality per anhydroglucose unit of 0 to about 0.4, a degree of substitution per anhydroglucose unit by $C_2$-$C_6$ alkyl ester groups of about 0.5 to about 2.8, and a degree of substitution per anhydroglucose unit by $R^1$ ester groups of about 0.2 to about 2.6.

11. The cellulose mixed ester according to claim 1, wherein the cellulose mixed ester is Levulinyl-acetyl Ester of Cellulose (LAC-1)

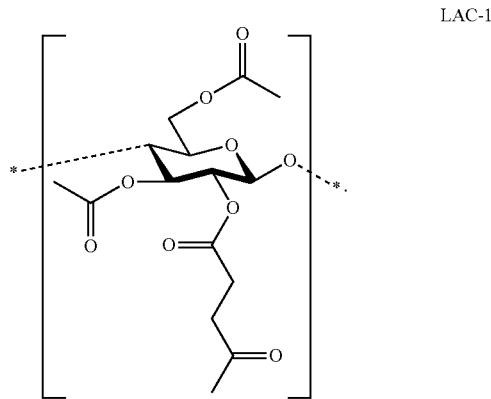

LAC-1 in which n is an integer from 2 to 250.

12. The cellulose mixed ester according to claim 1, wherein the cellulose mixed ester is Levulinyl-butyryl Ester of Cellulose.

13. The cellulose mixed ester according to claim 1, wherein $D_s$ is 3.15 esters per anhydroglucose unit, $D_{Lev}$ is 1.22, $T_g$ is 103.4° C., $M_w$ is 9970, and $D_p$ is 27.

14. The cellulose mixed ester according to claim 1, wherein $D_{Tot}$ is 3.05, $D_{Lev}$ is 1.20, $D_{Ac}$ is 1.85, and $T_g$ is 108° C.

15. The cellulose mixed ester according to claim 1, wherein $D_{Tot}$ is 3.5, $D_{Lev}$ is 0.7, $D_{Ac}$ is 2.8, $T_g$ is 103° C., and Mw is 7600.

16. The cellulose mixed ester according to claim 1, wherein the cellulose mixed ester is Levulinyl-propionyl Ester of Cellulose.

17. A process for preparing the cellulose mixed ester of claim 1, comprising the steps of:
(a) combining an alkyl carboxylic anhydride, levulinic acid and one or more acids independently selected from the group consisting of Brønsted acids, Lewis acids, or mixtures of Lewis acids with Brønsted acids, with the proviso that when the Brønsted acid is phosphoric acid, a Lewis acid must be present; and
(b) contacting the reaction mixture from step (a) with cellulose to produce a solution containing a cellulose mixed ester.

18. The process according to claim 17 wherein the reaction mixture is heated at about 120° C. in step (b), more preferably the cellulose and the reaction mixture are heated at about 120° C., for about 2 to about 6 hours in step (b), with the proviso that if a chlorinated solvent is used, it is heated at reflux, or alternatively, the cellulose and the reaction mixture are heated using microwave energy in step (b).

19. The process according to claim 17, further comprising the step of:
(c) diluting the solution obtained in step (b) with an aqueous solution containing magnesium acetate, sodium acetate, acetic acid or sodium bicarbonate to produce a diluted solution containing the cellulose mixed ester.

20. The process according to claim 17, further comprising the steps of:
(d) mixing the diluted solution obtained in step (c) with water; and
(e) recovering the cellulose mixed ester.

21. The cellulose mixed ester produced by the process of claim 17, wherein a total degree of substitution per anhydroglucose unit is about 2.5 to about 3.5,
a residual hydroxyl functionality per anhydroglucose unit is about 0 to about 0.5,
a degree of substitution per anhydroglucose unit by $C_2$-$C_6$ ester groups is about 0.5 to about 2.8, and
a degree of substitution per anhydroglucose unit by levulinyl ester groups is about 0.2 to about 2.6.

22. A method for preparing a cellulose mixed ester of formula (II) according to claim 10, comprising the steps of:
reacting a cellulose mixed ester of formula (I) according to claim 9 with an alkoxyamine or an aryloxyamine or an acyl hydrazide to produce a cellulose mixed ester of formula (II).

23. A composition comprising one or more cellulose mixed esters according to claim 1, wherein the composition further comprises one or more solvents and/or one or more additives.

24. A composition comprising one or more cellulose mixed esters according to claim 9, wherein the composition further comprises one or more solvents and/or one or more additives.

25. A composition comprising one or more cellulose mixed esters according to claim 10, wherein the composition further comprises one or more solvents and/or one or more additives.

* * * * *